(12) United States Patent
Azizi et al.

(10) Patent No.: US 10,361,834 B2
(45) Date of Patent: Jul. 23, 2019

(54) SUBCARRIER ALLOCATIONS FOR OPERATION IN MIXED BANDWIDTH ENVIRONMENTS

(71) Applicant: Intel IP Corporation, Santa Clara, CA (US)

(72) Inventors: Shahrnaz Azizi, Cupertino, CA (US); Robert Stacy, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/610,131

(22) Filed: May 31, 2017

(65) Prior Publication Data

US 2018/0006793 A1 Jan. 4, 2018

Related U.S. Application Data

(63) Continuation of application No. 14/581,989, filed on Dec. 23, 2014, now Pat. No. 9,716,579.

(60) Provisional application No. 62/039,233, filed on Aug. 19, 2014.

(51) Int. Cl.
| | |
|---|---|
| *H04J 11/00* | (2006.01) |
| *H04L 5/00* | (2006.01) |
| *H04W 28/20* | (2009.01) |

(52) U.S. Cl.
CPC .......... *H04L 5/0058* (2013.01); *H04L 5/0023* (2013.01); *H04L 5/0037* (2013.01); *H04L 5/0039* (2013.01); *H04L 5/0064* (2013.01); *H04W 28/20* (2013.01); *H04L 5/0048* (2013.01)

(58) Field of Classification Search
CPC ............. H04W 72/0453; H04W 28/20; H04W 72/048; H04L 5/0048; H04L 1/0016; H04L 5/0007; H04L 1/0041
See application file for complete search history.

(56) References Cited

U.S. PATENT DOCUMENTS

| | | | | |
|---|---|---|---|---|
| 8,270,435 | B2* | 9/2012 | Olszewski | ............ H04L 5/0007 370/208 |
| 8,630,673 | B2* | 1/2014 | Chakraborty | ......... H04L 5/0007 375/260 |
| 8,867,453 | B2* | 10/2014 | Khan | .................... H04W 72/04 370/329 |
| 8,995,378 | B2* | 3/2015 | Cheong | ............. H04W 72/0453 370/329 |

(Continued)

FOREIGN PATENT DOCUMENTS

| | | |
|---|---|---|
| EP | 2271150 | 1/2011 |
| EP | 3149879 A2 | 4/2017 |

OTHER PUBLICATIONS

European Search Report for European Application No. 15833460.7, dated Feb. 3, 2018, 8 pages.

(Continued)

*Primary Examiner* — Hanh N Nguyen
(74) *Attorney, Agent, or Firm* — Eversheds Sutherland (US) LLP

(57) ABSTRACT

Embodiments of the disclosure provide bandwidth allocation in wireless telecommunications including communication devices that can operate according to different operating bandwidth. The bandwidth allocation can include allocation of subcarrier blocks having specific sizes. The subcarriers blocks can be contiguous within a channel or can be non-contiguous or distributed.

14 Claims, 14 Drawing Sheets

(56) References Cited

U.S. PATENT DOCUMENTS

| | | | |
|---|---|---|---|
| 9,544,902 B1* | 1/2017 | Narendran | H04W 72/048 |
| 9,716,579 B2* | 7/2017 | Azizi | H04W 28/20 |
| 9,844,028 B2* | 12/2017 | Yang | H04L 1/0041 |
| 9,906,343 B2* | 2/2018 | Azizi | H04L 5/0048 |
| 2011/0026623 A1 | 2/2011 | Sudhir et al. | |
| 2013/0229996 A1 | 9/2013 | Wang et al. | |
| 2016/0226638 A1* | 8/2016 | Azizi | H04L 5/0048 |

OTHER PUBLICATIONS

European Exam Report for European Application No. 15833760.7, dated Nov. 11, 2018, 3 pages.
European Exam Report for European Application No. 15833460.7, dated Apr. 17, 2019, 4 pages.

\* cited by examiner

| BLOCK CONVOLUTIONAL CODING (DATA TONES, PILOT TONES) | | LDPC CONVOLUTIONAL CODING (DATA TONES + PILOT TONES) | |
|---|---|---|---|
| $N_A = 1008$ | $N_A = 996$ | $N_A = 1008$ | $N_A = 996$ |
| 56 (52,4) | 55 (52,3) | 56 | 55 |
| 106 (102,4) | 110 (102,8) | 106 | 110 |
| 236 (228,8) | 242 (234,8) | 236 | 242 |
| 500 (490,10) | 498 (486,12) | 500 | 498 |
| 1008 (990,18) | 996 (984,12) | 1008 | 996 |

FIG. 7

| INDEX | NUMBER OF ALLOCATIONS | 56 TONES | 106 TONES | 236 TONES | 500 TONES | 1008 TONES | LEFTOVER TONES |
|---|---|---|---|---|---|---|---|
| 1 | 1 | 0 | 0 | 0 | 0 | 1 | 0 |
| 2 | 2 | 0 | 0 | 0 | 2 | 0 | 8 |
| 3 | 7 | 0 | 5 | 2 | 0 | 0 | 6 |
| 4 | 5 | 1 | 0 | 4 | 0 | 0 | 8 |
| 5 | 5 | 1 | 2 | 1 | 1 | 0 | 4 |
| 6 | 8 | 2 | 4 | 2 | 0 | 0 | 0 |
| 7 | 9 | 2 | 6 | 1 | 0 | 0 | 24 |
| 8 | 7 | 3 | 1 | 3 | 0 | 0 | 26 |
| 9 | 9 | 3 | 5 | 0 | 1 | 0 | 22 |
| 10 | 10 | 4 | 5 | 1 | 0 | 0 | 18 |
| 11 | 8 | 5 | 0 | 3 | 0 | 0 | 30 |
| 12 | 8 | 5 | 2 | 0 | 1 | 0 | 16 |
| 13 | 11 | 6 | 4 | 1 | 0 | 0 | 12 |
| 14 | 9 | 7 | 1 | 0 | 1 | 0 | 10 |
| 15 | 12 | 8 | 3 | 1 | 0 | 0 | 6 |
| 16 | 10 | 9 | 0 | 0 | 1 | 0 | 4 |
| 17 | 13 | 10 | 2 | 1 | 0 | 0 | 0 |
| 18 | 14 | 10 | 4 | 0 | 0 | 0 | 24 |
| 19 | 15 | 12 | 3 | 0 | 0 | 0 | 18 |
| 20 | 16 | 14 | 2 | 0 | 0 | 0 | 12 |
| 21 | 17 | 16 | 1 | 0 | 0 | 0 | 6 |
| 22 | 18 | 18 | 0 | 0 | 0 | 0 | 0 |

FIG. 8

| INDEX | NUMBER OF ALLOCATIONS | 56 TONES | 106 TONES | 238 TONES | 500 TONES | 1008 TONES | LEFTOVER TONES |
|---|---|---|---|---|---|---|---|
| 1 | 1 | 0 | 0 | 0 | 0 | 1 | 0 |
| 2 | 2 | 0 | 0 | 0 | 2 | 0 | 8 |
| 3 | 7 | 0 | 5 | 2 | 0 | 0 | 2 |
| 4 | 5 | 1 | 0 | 4 | 0 | 0 | 0 |
| 5 | 6 | 1 | 3 | 1 | 1 | 0 | 2 |
| 6 | 6 | 1 | 2 | 3 | 0 | 0 | 26 |
| 7 | 6 | 2 | 3 | 1 | 0 | 0 | 22 |
| 8 | 7 | 3 | 1 | 3 | 0 | 0 | 20 |
| 9 | 7 | 3 | 3 | 0 | 1 | 0 | 22 |
| 10 | 10 | 4 | 5 | 1 | 0 | 0 | 16 |
| 11 | 8 | 5 | 0 | 3 | 0 | 0 | 14 |
| 12 | 8 | 5 | 2 | 0 | 1 | 0 | 16 |
| 13 | 11 | 6 | 4 | 1 | 0 | 0 | 10 |
| 14 | 9 | 7 | 1 | 0 | 1 | 0 | 10 |
| 15 | 12 | 8 | 3 | 1 | 0 | 0 | 4 |
| 16 | 10 | 9 | 0 | 0 | 1 | 0 | 4 |
| 17 | 13 | 10 | 2 | 1 | 0 | 0 | 28 |
| 18 | 15 | 12 | 3 | 0 | 0 | 0 | 18 |
| 19 | 16 | 14 | 2 | 0 | 0 | 0 | 12 |
| 20 | 17 | 16 | 1 | 0 | 0 | 0 | 6 |
| 21 | 18 | 18 | 0 | 0 | 0 | 0 | 0 |

FIG. 9

| INDEX | NUMBER OF ALLOCATIONS | 55 TONES | 110 TONES | 242 TONES | 498 TONES | 996 TONES | LEFTOVER TONES |
|---|---|---|---|---|---|---|---|
| 1 | 1 | 0 | 0 | 0 | 0 | 1 | 0 |
| 2 | 2 | 0 | 0 | 0 | 2 | 0 | 0 |
| 3 | 3 | 0 | 0 | 2 | 1 | 0 | 14 |
| 4 | 4 | 0 | 0 | 4 | 0 | 0 | 28 |
| 5 | 5 | 0 | 5 | 0 | 0 | 0 | 6 |
| 6 | 6 | 1 | 4 | 0 | 1 | 0 | 3 |
| 7 | 7 | 1 | 4 | 2 | 0 | 0 | 17 |
| 8 | 10 | 2 | 8 | 0 | 0 | 0 | 6 |
| 9 | 7 | 3 | 3 | 0 | 1 | 0 | 3 |
| 10 | 8 | 3 | 3 | 2 | 0 | 0 | 17 |
| 11 | 11 | 4 | 7 | 0 | 0 | 0 | 6 |
| 12 | 8 | 5 | 2 | 0 | 1 | 0 | 3 |
| 13 | 9 | 5 | 2 | 2 | 0 | 0 | 17 |
| 14 | 12 | 6 | 6 | 0 | 0 | 0 | 6 |
| 15 | 9 | 7 | 1 | 0 | 1 | 0 | 3 |
| 16 | 10 | 7 | 1 | 2 | 0 | 0 | 17 |
| 17 | 13 | 8 | 5 | 0 | 0 | 0 | 6 |
| 18 | 10 | 9 | 0 | 0 | 1 | 0 | 3 |
| 19 | 11 | 9 | 0 | 2 | 0 | 0 | 17 |
| 20 | 14 | 10 | 4 | 0 | 0 | 0 | 6 |
| 21 | 15 | 12 | 3 | 0 | 0 | 0 | 6 |
| 22 | 16 | 14 | 2 | 0 | 0 | 0 | 6 |
| 23 | 17 | 16 | 1 | 0 | 0 | 0 | 6 |
| 24 | 18 | 18 | 0 | 0 | 0 | 0 | 6 |

FIG. 10

| NUMBER OF ALLOCATIONS | 56 TONES | 106 TONES | 236 TONES | 500 TONES | ALLOCATED TONES | LEFTOVER TONES |
|---|---|---|---|---|---|---|
| 3 | 0 | 0 | 2 | 1 | 972 | 36 ⟵ 1110 |
| 4 + 1 | 0 + 1 | 2 | 1 | 1 | 948 | 60 → 4 |
| 5 | 2 | 1 | 1 | 1 | 954 | 54 |
| 5 | 4 | 0 | 1 | 1 | 960 | 48 ⟵ 1120 |
| 6 + 1 | 2 + 1 | 3 | 0 | 1 | 930 | 78 → 22 ⟵ 1130 |
| 7 + 1 | 4 + 1 | 2 | 0 | 1 | 936 | 72 → 16 ⟵ 1140 |
| 9 + 1 | 8 + 1 | 0 | 0 | 1 | 948 | 60 → 4 ⟵ 1150 |
| 4 + 1 | 0 + 1 | 0 | 4 | 0 | 944 | 64 → 8 ⟵ 1160 |
| 6 + 1 | 2 | 1 | 3 | 0 | 926 | 82 → 26 |
| ⋮ | ⋮ | ⋮ | ⋮ | ⋮ | | ⟵ 1170 |
| 16 + 2 | 16 + 2 | 0 | 0 | 0 | 896 | 112 → 0 |

FIG. 11

SUBCARRIER ALLOCATIONS FOR OPERATION IN MIXED BANDWIDTH ENVIRONMENTS

CROSS-REFERENCE TO RELATED APPLICATION

The present application is a continuation of application Ser. No. 14/581,989, filed Dec. 23, 2014, which claims the benefit of and priority of Provisional Application No. 62/039,233, filed Aug. 19, 2014, which are hereby incorporated herein by reference in their entireties.

BACKGROUND

Wireless communication of information includes allocation of bandwidth and/or other types of resources. Typically, an access point (AP) can allocate bandwidth to communication devices, such as stations (STAs), user equipment, or other type of client devices. The more efficiently the AP allocates the bandwidth to the communication devices the more efficiently the bandwidth available to a wireless network is used, and thus the faster the communication provided by the wireless network. In addition, wireless communications typically occur in environments in which legacy communication devices coexist with contemporaneous communication devices. As such, more than one standard may be utilized in a wireless network, such as a wireless local-area network (WLAN). For example, IEEE 802.11ax, referred to as High Efficiency WLAN (HEW), is a successor to the IEEE 802.11ac standard for WLANs. The Wi-Fi standards have evolved from IEEE 802.11b to IEEE 802.11g/a to IEEE 802.11n to IEEE 802.11ac and now to IEEE 802.11ax and DensiFi.

BRIEF DESCRIPTION OF THE DRAWINGS

The accompanying drawings form an integral part of the disclosure and are incorporated into the present specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

FIG. 7 presents examples of allocation sizes in accordance with one or more embodiments of the disclosure.

FIGS. 8, 9, and 10 present examples of scheduling modes of solid format generated via variable size allocations in accordance with one or more embodiments of the disclosure.

FIG. 11 presents an example of scheduling modes of mixed bandwidth format generated via variable size allocations in accordance with one or more embodiments of the disclosure.

DETAILED DESCRIPTION

Figure 1:
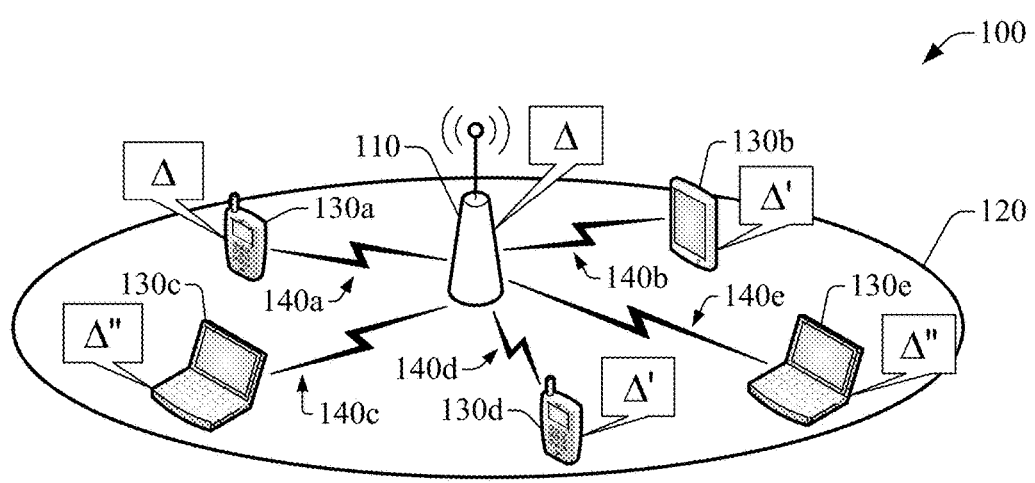
FIG. 1 illustrates an example of an operational environment in accordance with one or more embodiments of the disclosure.

The disclosure recognizes and addresses, in one aspect, the issue of wireless telecommunication in high-density deployment scenarios in which several communication devices can operate at different bandwidths. More specifically, yet not exclusively, the disclosure provides devices, systems, techniques, and/or computer program products for allocation of bandwidth in such high-density deployment scenarios. As described in greater detail below, the computing devices, systems, platforms, methods, and computer program products disclosed herein provide bandwidth allocation in mixed bandwidth telecommunication environments. Certain embodiments can provide or otherwise implement bandwidth allocation in wireless environments including communication devices that can operate according to different operating bandwidths. Such environments are generally referred to as "mixed bandwidth environments." The bandwidth allocation can rely or otherwise leverage different allocation sizes including groups having different numbers of orthogonal frequency division multiple access (OFDMA) tones. Such groups can cover the entire spectral width of a channel utilized by an access point to transmit and receive wireless communications. The bandwidth allocation in accordance with the disclosure can support multi-user operation in mixed bandwidth environments while providing substantial high-tone utilization efficiency. To that end, in at least certain embodiments, the bandwidth allocation can include allocation of subcarrier blocks having specific sizes, where the subcarrier blocks can be contiguous within a channel or can be non-contiguous or distributed. While various features of the disclosure are illustrated in connection with 80 MHz waveforms for use in an 80 MHz environment (e.g., a basic service set (BSS) in Wi-Fi), the disclosure is not so limited and waveforms for use in operational environments (e.g., BSSs) with 20 MHz, 40 MHz, 160 MHz or 80+80 MHz channel widths can be obtained by scaling the 80 MHz waveforms. For instance, for a BSS that operates in a 160 MHz channel, allocation sizes can be determined as two different instances or combinations of allocation sizes for a BSS that operates in 80 MHz.

Certain embodiments of the disclosure provide allocation of OFDMA subcarriers (or tones) for both the uplink and downlink waveforms for multi-user operation in 802.11ax (High Efficiency WLAN or HEW). The waveform can operate with a four times (4×) longer symbol duration than existing 802.11 OFDM waveforms (VHT, HT or non-HT) defined in the existing 802.11 specification. In addition or in other embodiments, different frame formats are provided that permit flexible resource block allocation with variable OFDMA allocation sizes, and that can support operation with communication devices (e.g., stations) with different receive or transmit bandwidths (e.g., 20 MHz, 40 MHz, or 80 MHz). The allocation sizes in accordance with the disclosure can determined by considering a number of trade-offs, such as frequency efficiency, reuse of existing 802.11 architectural building blocks, ease of implementation, and coexistence with legacy devices. In certain embodiments, various OFDMA allocation sizes can be determined for a 1024-point fast Fourier transform (FFT) in an IEEE 802.11ax environment having 80 MHz bandwidth of operation. The 1024-point FFT can be used with the 4× symbol duration of IEEE 802.11n/ac and can permit operations in both outdoor and indoor environments. In an outdoor environment, the longer symbol duration can permit utilization of a more efficient cyclic prefix (CP) in order to overcome the longer delay spread, and in an indoor environment, it allows a more relaxed requirement for clock timing accuracy. Various examples of allocation sizes (including data tones and pilot tones, for example) for various resource blocks are provided in this disclosure. In certain embodiments, the disclosure provides scheduling modes that make the most use of available bandwidth while allowing concurrent operation of 20 MHz and 40 MHz devices within an 80 MHz BSS in order to enable legacy coexistence and flexibility of deployment for interference mitigation.

In contrast to conventional technologies for bandwidth allocation, embodiments of this disclosure can permit multi-user (MU) operation in mixed bandwidth environments, where communication devices have different operating channel widths—e.g., devices operating with 20 MHz, 40 MHz and 80 MHz receive bandwidth within an 80 MHz BSS. In addition, embodiments of the disclosure can permit MU operation in high-density deployments, including better control over larger bandwidths to be scheduled by a HEW Access Point (AP) and re-utilization of legacy architectures and numerologies.

With reference to the drawings, FIG. 1 presents a block diagram of an example operational environment 100 for bandwidth allocation in accordance with at least certain aspects of the disclosure. The operational environment 100 includes an access point 110, which can be embodied, for example, in a low-power base station, that can exchange wireless signals with devices within a confined region 120. The confined region 120 can be embodied in or can include an indoor region (e.g., a commercial facility, such as a shopping mall) and/or a spatially-confined outdoor region (such as an open or semi-open parking lot or garage). The access point 110 (also referred to as AP 110) can operate in accordance with a specific radio technology protocol (e.g., 3G, LTE, or LTE Advanced, Wi-Fi, or the like). In certain embodiments, the AP 110 can operate in accordance with the IEEE 802.11ax standard (also referred to as high-efficiency (HE) WLAN or HEW), and can exchange wireless signals with one or more communication devices within the confined region 120. In such embodiments, the operational environment 100 may be referred to as a basis service set.

In certain scenarios, the AP 110 can communicate with multiple communication devices. In certain embodiments, the multiple communication devices can utilize the same bandwidth for communication as the AP 110—e.g., bandwidth $\Delta$, such as 80 MHz. In other embodiments, two or more bandwidths can be utilized by the multiple communication devices—e.g., at least one of the communication devices can utilize a first bandwidth (e.g., bandwidth $\Delta$), at least a second one of the communication devices can utilize a second bandwidth (bandwidth $\Delta'$), and at least a third one of the communication devices can utilize a third bandwidth (e.g., bandwidth $\Delta''$). For instance, $\Delta' < \Delta$ and $\Delta'' < \Delta$, and $\Delta = 80$ MHz, $\Delta' = 40$ MHz and $\Delta'' = 20$ MHz. Therefore, such embodiments may be referred to as "mixed-bandwidth telecommunication environments" or, more simply, "mixed-bandwidth environment."

As an illustration, in the operational environment 100, the AP 110 can exchange wireless signals with five communication devices 130a, 130b, 130c, 130d, and 130e. The communication devices 130a-130e can exchange wireless signal with the AP 110 via respective wireless links 140a-140e in accordance with specific radio technology protocols (e.g., IEEE 802.11ac, IEEE 802.11ax, etc.). It should be appreciated that while the five communication devices 130a-130e are depicted as different type of devices (e.g., smartphones, tablet computer, and laptops), the disclosure is not so limited and communication with devices of the same type also is contemplated. It should further be appreciated that communication between the AP 110 and more or less than five communication devices also is contemplated in this disclosure.

In certain embodiments, the AP 110 and the communication devices 130a-130e, as well as other computing devices contemplated in the present disclosure, can include electronic devices having computational resources, including processing resources (e.g., processor(s)), memory resources (memory devices (also referred to as memory), software and/or firmware, and communication resources for exchange of information within the computing device and/or with other computing devices. Such resources can have different levels of architectural complexity depending on specific device functionality. Exchange of information among computing devices in accordance with aspects of the disclosure can be performed wirelessly as described herein, and thus, in one aspect, the AP 110 and the communication devices 130a-130e, as well as any other computing device of this disclosure, can be generally referred to as wireless computing devices or wireless devices. Example of computing devices contemplated in the present disclosure include desktop computers with wireless communication resources; mobile computers, such as tablet computers, smartphones, notebook computers, laptop computers with wireless communication resources, Ultrabook™ computers; gaming consoles; mobile telephones; blade computers; programmable logic controllers; near field communication devices; customer premises equipment with wireless communication resources, such a set-top boxes, wireless routers, wireless-enabled television sets, or the like; and so forth. The wireless communication resources can include radio units (also referred to as radios) having circuitry for processing wireless signals, processor(s), memory device(s), and the like, where the radio, the processor(s), and the memory device(s) can be coupled via a bus architecture. Accordingly, in the present disclosure, communication device also can be referred to as a "wireless communication device," a "wireless computing device," or a "computing device," and such terminology may be used interchangeably.

In order to communicate with multiple communication devices, the AP 110 can implement communication techniques for multiple access, such as OFDMA. In OFDMA, the available transmit and/or receive bandwidth is divided into several portions (generally referred to as subcarriers), and a group of the several portions can be assigned to a specific communication device. In certain embodiments, the AP 110 can operate with a bandwidth $\Delta$ (such as 80 MHz)

in which the AP 110 can transmit wireless signals to a communication device and/or receive wireless signals therefrom. The wireless signal can be transmitted and/or received according to OFDMA. As such, the AP 110 can divide the bandwidth into a specific number of subcarriers and can allocate a portion of the subcarriers for communication with the communication device. The portion of subcarriers can be referred to as a "resource block allocation" and the number of subcarriers present in the allocated portion can be referred to as an "allocation size."

The AP 110 can select or otherwise determine an allocation of a resource block based at least on available allocation sizes and factors such as signal-to-noise ratio (SNR), received signal strength (as quantified by a received signal strength indicator (RSSI), for example), or other type of metrics representative of communication conditions. An allocation size can be selected from a group of available allocations sizes in accordance with this disclosure. The AP 110 can schedule the allocation of the resource block for the communication device to transmit and/or receive a wireless communication. In a multiple user (MU) scenario in which the AP 110 can communicate with multiple communication devices (e.g., communication devices 130a-130e), the AP 110 can select or otherwise determine an allocation for each of the multiple communication devices. Each of the allocations can have a specific allocation size.

In certain embodiments, allocation sizes can be specific to the bandwidth that a communication device utilizes for wireless reception and/or wireless transmission. As described herein, such a bandwidth can be the same or less than the bandwidth utilized for wireless communication by the AP 110.

Figure 2:
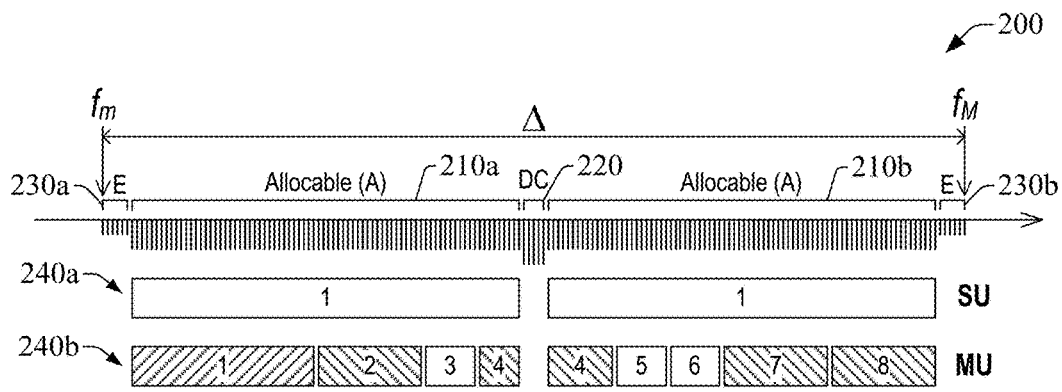
FIG. 2 illustrates an example of a solid frame format in accordance with one or more embodiments of the disclosure.

In certain scenarios, the AP 110 can communicate with multiple communication devices operating in the same bandwidth as the AP 110. As such, in the illustrated operational environment 100, the operating bandwidth of the illustrated communication devices satisfy the following relationship: $\Delta=\Delta'=\Delta''$. For example, $\Delta=80$ MHz. In such scenarios, in OFDMA operation, the bandwidth $\Delta$ can be divided into N subcarriers, where N corresponds to the number of points in a discrete Fast Fourier Transform (FFT) utilized, in part, to compose a waveform. A portion of the N subcarriers can be assigned as null subcarriers, either subcarriers for direct conversion or edge subscarriers. More specifically, a number $N_{DC}$ subcarriers can be assigned as subcarriers for direct conversion (DC). As such, the $N_{DC}$ subcarriers are located in frequencies around the center of the interval spanned by the bandwidth $\Delta$. In addition, a first portion ($N_{E1}$) and a second portion ($N_{E2}$) of the N subcarriers can be assigned as edge subcarriers. Subcarriers for DC (or DC subcarriers) and edge subcarriers may be referred to as nulls. Therefore, the number of allocable subcarriers is $N_A=N-N_{DC}-N_{E1}-N_{E2}$. FIG. 2 illustrates a diagram 200 of an example frame format and example resource allocations in a scenario in which all of the communication devices (e.g., HEW stations) have a common receiving and transmitting bandwidth which equals the operating bandwidth $\Delta$ of the access point. The frame format may be referred to as "$\Delta$ solid format." As illustrated, the bandwidth $\Delta=f_M-f_m$, where $f_M$ and $f_m$ each correspond to a frequency in the spectrum of electromagnetic radiation, and satisfy $f_M>f_m$.

To make the most efficient use of available subcarriers (or tones), in this format, the AP 110 can schedule various OFDMA allocations that can cover the entire bandwidth except for subcarriers 220 at DC and edges 230a and 230b. Accordingly, as illustrated, the available subcarriers can span two portions 210a and 210b (each labeled "Allocable (A)") of the entire bandwidth. Panel 240a presents an example of one such allocation, where a single user (SU), labeled "1," is allocated to the entire set of allocable subcarriers. Panel 240b present an example of a resource allocation in which the AP 110 can utilize or otherwise leverage three allocation sizes to schedule a multi-user (MU) resource block allocation, in which the AP 110 can allocate resource blocks to eight users (e.g., eight communication devices): "1," "2," "3," "4," "5," "6," "7," "8." In the panel 240b, a first size is represented as a solid white block, a second size is represented as a left-slanted hashed block, and a third size is represented as a right-slanted hashed block. It should be appreciated that the resource allocation for the 4th user (labeled as "4") is divided, including allocable subcarriers before and after the DC subcarriers 220, in order to avoid the null subcarriers that are needed at DC and around DC. Such a division can simplify direct-conversion receiver designs. Specifically, in certain embodiments, a direct-conversion receiver architecture can often suffer from direct current (DC) offset, which may be a consequence of an imperfect direct-conversion process. In order to minimize or otherwise mitigate the impact of the DC offset, subcarriers at and around DC can be nulled in that such subcarriers may not be utilized for transmission of information bits. Utilization of such subcarriers for transmission of information bit(s) can result in the bit(s) being lost due to imperfections of the receiver and/or the process(es) utilized to receive (e.g., decode, demodulate, combinations thereof, or the like).

As described herein, other multi-user resource allocations besides the one exemplified in the panel 240b can be contemplated.

In embodiments in which N=1024, at least two examples of the "$\Delta$ solid format" can be implemented. In one example, 11 subcarriers can be configured as edge carriers, where six subcarriers can form the group 230a (e.g., $N_{E1}=6$) and five subcarriers can form the group 230b (e.g., $N_{E2}=5$); five subcarriers can form the nulls at DC 220 (e.g., $N_{DC}=5$); and $N_A=1008$ subcarriers can be allocable or otherwise usable. It should be appreciated that an additional solid format frame can be generated by having $N_{E1}=6$ and $N_{E2}=5$. In another example, 23 subcarriers can be configured as edge carriers, where 12 subcarriers can form the group 230a (e.g., $N_{E1}=12$) and 11 subcarriers can form the group 230b (e.g., $N_{E2}=11$); five subcarriers can form the nulls at DC 220 (e.g., $N_{DC}=5$); and $N_A=996$ subcarriers can be allocable or otherwise usable.

As described herein, in mixed band environments, the AP 110 can communicate with communication devices including one or more communication devices having an operating bandwidth that is different from $\Delta$ (the operating bandwidth of the AP 110) and one or more communication devices having an operating bandwidth that is equal to $\Delta$. As an example, in the illustrated operational environment 100, the operating bandwidth of the communication devices in the confined region 120 can satisfy $\Delta'=\Delta/2$ and $\Delta''=\Delta/4$, where the bandwidth $\Delta$ can adopt any one of the following values 20 MHz, 40 MHz, 80 MHz, 160 MHz, or 80+80 MHz (which is a non-contiguous two-channel configuration, each channel having 80 MHz width). For instance, the operating bandwidth of the communication device 130a can be $\Delta=80$ MHz, the operating bandwidth of the communication devices 130b and 130d can be $\Delta'=40$ MHz, and the operating bandwidth of the communication devices 130c and 130e can be $\Delta''$. In one of such environments, the AP 110 can utilize or otherwise leverage a frame format referred to as a "$\Delta$ mixed bandwidth format."

Figure 3:
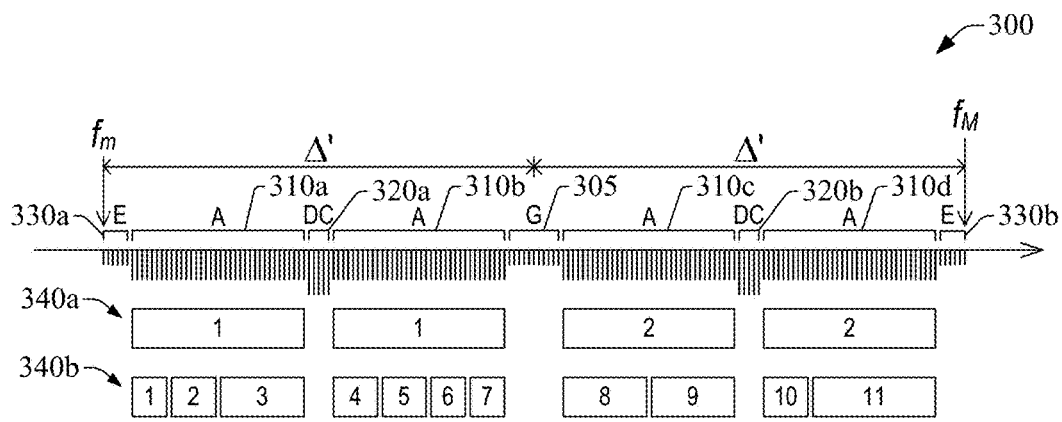
FIGS. 3, 4, and 5 illustrate examples of mixed bandwidth frame formats and resource allocations in accordance with one or more embodiments of the disclosure.

FIG. 3 presents a diagram 300 of an example of a Δ mixed-bandwidth format that can be utilized for communication between the AP 110 and one or more communication devices having operating bandwidth $\Delta'=\Delta/2$. The mixed bandwidth frame includes two sub-channels separated by a group 305 of guard subcarriers (labeled with the letter "G"). The frame also includes two groups 330a and 330b of edge subcarriers, and two groups 320a and 320b of null subcarriers. As illustrated, each of the groups is centered at its respective sub-channel. In addition, the mixed bandwidth frame includes four groups 310a-310d of allocable subcarriers (labeled with the letter "A").

Panel 340a in diagram 300 presents an example of a multi-user resource block allocation for two users (e.g., communication devices; labeled "1" and "2"). The AP 110 can rely on a single allocation size in order to schedule the resource blocks for the two users. Panel 340b presents another example of a multi-user resource block allocation for 11 users (e.g., 11 communication devices): "1," "2," "3," "4," "5," "6," "7," "8," "9," "10," and "11." In such an allocation, the AP 110 can rely on four different allocation sizes.

Figure 4:
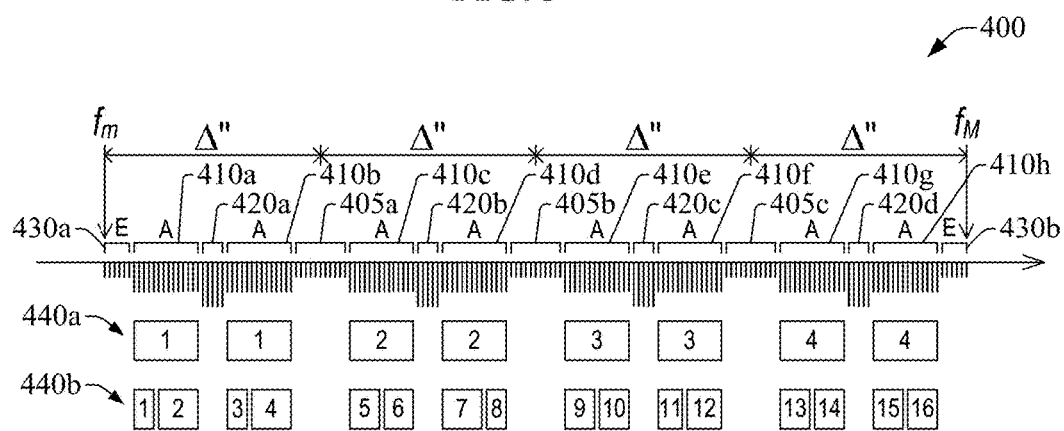

FIG. 4 presents a diagram 400 of an example of a Δ mixed-bandwidth format that can be utilized for communication between the AP 110 and one or more communication devices having operating bandwidth $\Delta''=\Delta/4$. The mixed bandwidth frame includes four sub-channels which are mutually separated by guard subcarriers. As illustrated, three groups 405a-405c of guard subcarriers can separate the four sub-channels. The frame also includes two groups 430a and 430b of edge subcarriers and four groups 420a-420d of nulls. As illustrated, each of the groups of nulls is associated with a sub-channel and is centered at its respective sub-channel. In addition, the mixed bandwidth frame includes eight groups 410a-410h of allocable subcarriers (each of the groups labeled with the letter "A").

Panel 440a in diagram 400 presents an example of a multi-user resource block allocation for four users (e.g., communication devices; labeled "1," "2," "3," and "4"), each of which can have an operating (receive or transmit) bandwidth equal to Δ". The AP 110 can rely on a single allocation size in order to schedule the resource blocks for the four users. Panel 440b presents another example of a multi-user resource block allocation for 16 users (e.g., 16 communication devices): "1," "2," "3," "4," "5," "6," "7," "8," "9," "10," "11," "12," "13," "14," "15," and "16." In such an allocation, the AP 110 can rely on three different allocation sizes to schedule resource blocks for the 16 users.

Figure 5:
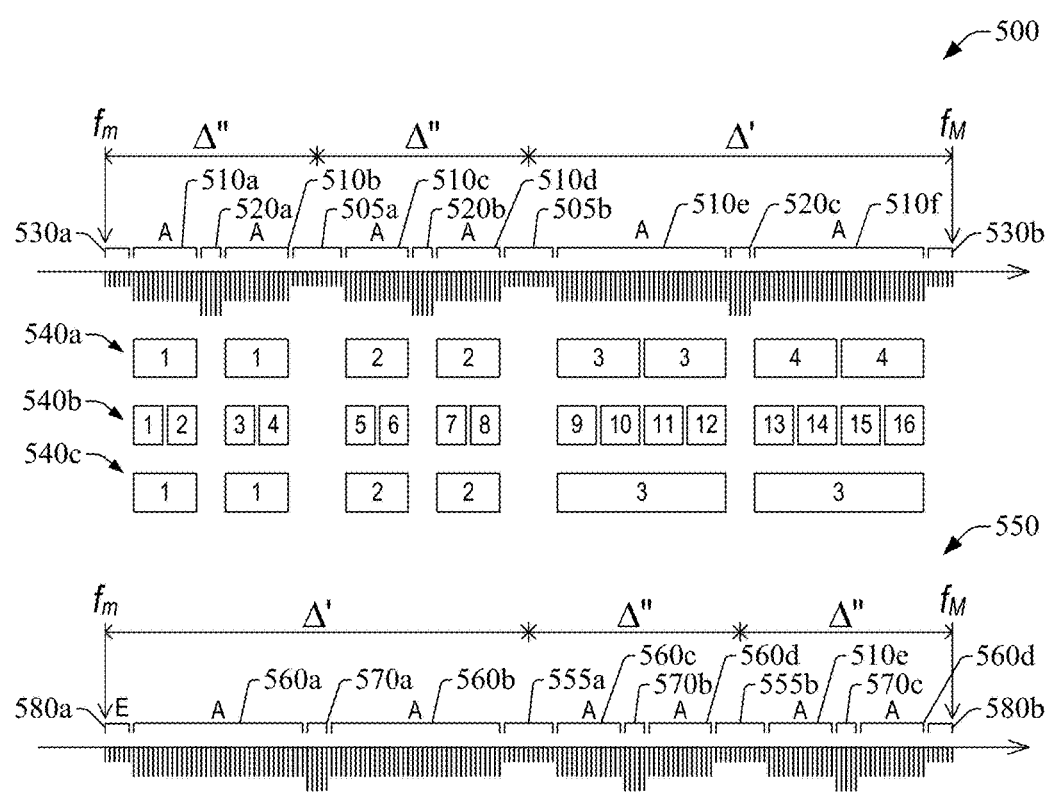

FIG. 5 presents two diagrams 500 and 550 that illustrates two examples of Δ mixed-bandwidth format that can be utilized for communication between the AP 110 and one or more communication devices having different operating bandwidths: Δ, $\Delta'=\Delta/2$, and $\Delta''=\Delta/4$. In one embodiment, Δ=80 MHz, Δ'=40 MHz, and Δ"=20 MHz. Therefore, 20 MHz, 40 MHz, or 80 MHz RF filtering can be performed, at a communication device, prior to decoding an illustrated frame in the downlink (DL), or prior to transmitting an illustrated frame in the uplink (UL).

As illustrated, the mixed bandwidth frame includes three sub-channels which are mutually separated by guard sub-carriers to permit the various operating bandwidths: Δ, Δ', and Δ". As illustrated in diagram 500, two of the sub-channels have width Δ" and the third sub-channel has width Δ'. Two groups 505a and 505b can separate the three sub-channels. The mixed bandwidth frame illustrated in the diagram 500 also includes two groups 530a and 530b of edge subcarriers and three groups 520a-520c of nulls. As illustrated, each of the groups of nulls is associated with a sub-channel and is centered at its respective sub-channel. In addition, the mixed bandwidth frame includes six groups 510a-510f of allocable subcarriers (each of the groups labeled with the letter "A"). In diagram 550, two of the sub-channels have width Δ' and the third sub-channel has width Δ". Two groups 555a and 555b can separate the three sub-channels. The mixed bandwidth frame illustrated in the diagram 550 also includes two groups 580a and 580b of edge subcarriers and three groups 570a-570c of nulls. As illustrated, each of the groups of nulls is associated with a sub-channel and is centered at its respective sub-channel. In addition, the mixed bandwidth frame includes six groups 560a-560f of allocable subcarriers (each of the groups labeled with the letter "A").

Panel 540a in diagram 500 presents an example of a multi-user resource block allocation for four users (labeled "1," "2," "3," and "4"). As illustrated, users "1" and "2" can have an operating (receive or transmit) bandwidth equal to Δ', and users "3" and "4" can have an operating (receive or transmit) bandwidth Δ. In one example, the AP 110 can rely on two allocation sizes in order to schedule the resource blocks for the four users. Panel 540b presents another example of a multi-user resource block allocation for 16 users (e.g., 16 communication devices): "1," "2," "3," "4," "5," "6," "7," "8," "9," "10," "11," "12," "13," "14," "15," and "16." In one example, the AP 110 can rely on a single allocation size to schedule resource blocks for the 16 users. In the illustrated allocation, the user (or communication device) that is allocated to the resource block 3 can have an operating (receive or transmit) bandwidth Δ". Panel 540c presents yet another example of a multi-user resource block allocation in which two communication devices (labeled "1" and "2") are each allocated to operate in the Δ" sub-channel (e.g., 20 MHz sub-channels), and a third communication device (labeled "3") is scheduled to operate in the Δ' sub-channel (e.g., a 40 MHz sub-channel).

The AP 110 can determine which frame format to transmit downlink or to receive uplink, and can schedule one or more communication devices accordingly. Therefore, in certain implementations, upon or after a communication device receives scheduling information from the AP 110, the communication device can determine, based on the scheduling information, the spectral region (e.g., group of subcarriers) where to receive or transmit the device's data. As such, the AP 110 and/or the communication device need not signal the frame format independently.

As described herein, the Δ mixed bandwidth format can permit operation of communication devices having operating bandwidths Δ' and Δ", where Δ', Δ"<Δ. For example, the 80 MHz mixed bandwidth format supports 20 MHz and 40 MHz station operation. In certain embodiments, the efficiency of the use of the bandwidth Δ (e.g., 80 MHz) can be increased by leveraging certain sub-carriers in the channel, and generating non-contiguous subcarrier allocations for a communication device. More specifically, a communication device having operating bandwidth Δ can be scheduled a non-contiguous resource block allocation including null subcarriers (e.g., guard subcarriers and/or DC subcarriers) in the Δ' sub-channel and/or Δ' sub-channel. In an embodiment in which Δ=80 MHz, Δ'=40 MHz, and Δ"=20 MHz, the subcarriers included in a non-contiguous resource allocation would otherwise be null subcarriers in the what would otherwise be null subcarriers in the 20 MHz and 40 MHz sub-channels.

Figure 6:
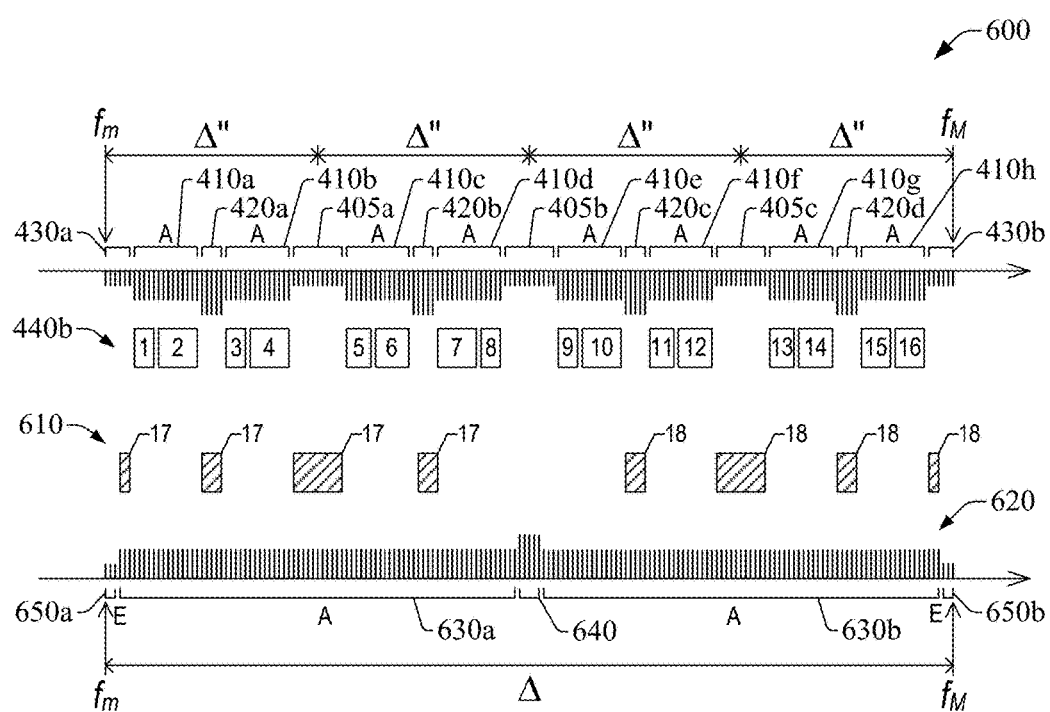
FIG. 6 illustrates another example of mixed bandwidth frame format and resource allocation in accordance with one or more embodiments of the disclosure.

FIG. 6 illustrates a mixed bandwidth format frame 600 that permits a non-contiguous resource allocation in accordance with one or more aspects of the disclosure. In the illustrated format, the channel can be divided in four sub-channels having width Δ". As described herein in connection with FIG. 4, the sub-channels can be separated by groups of guard subcarriers (groups 405a-405c), and each of the sub-channels can include a group of null subcarriers for DC conversion (e.g., groups 420a-420d). Allocable subcarriers can be utilized, for example, to schedule a MU resource block allocation for multiple devices having operating bandwidth Δ", as shown in panel 440b. In addition, for a communication device having operating bandwidth Δ, the AP 110 can schedule a non-contiguous resource allocation including subcarriers from one or more of the groups 430a, 430b, 420a-420d, or 405a-405c. Further, as shown in diagram, 620, the communication device having operating bandwidth Δ can be scheduled or otherwise allocation in subcarriers within two groups 630a and 630b of allocable subcarriers. Such groups can be separated by a group 640 of nulls subcarriers for DC. Two other groups 650a and 650b of nulls embody edge subcarriers. Panel 610 illustrates a multi-user non-contiguous resource block allocation for two users (labeled "17" and "18"). Such a communication device can (e.g., communication device 130a in operational environment 100) can receive and/or transmit information via the non-contiguous resource blocks 17 or non-contiguous resource blocks 18. Another communication device having an operating bandwidth Δ"—which can receive and/or transmit wireless signal using, for example, resource blocks 1, 2, 3, 4, 5, 6, 7, or 8—can process the subcarriers in the non-contiguous resource block 17 as guard subcarriers or DC subcarriers, as applicable, and can filter out such subcarriers when receiving information wirelessly or can null them when transmitting information wirelessly.

It can be appreciated that utilization of non-contiguous resource blocks in a mixed bandwidth frame can rely on stringent filtering in the sub-channels having widths Δ' and Δ", and increased quality of clock timing and/or oscillator frequency accuracies than in conventional devices operating at bandwidth Δ' and Δ". In one example, the AP 110 can operate according to IEEE 802.11ax protocols, in 80 MHz bandwidth, and can communicate with legacy communication devices that operate according to IEEE 802.11ac protocols in 20 MHz and/or 40 MHz bandwidth. As such, utilization of non-contiguous resource blocks can require more stringent 20 MHz and/or 40 MHz filtering, and better clock timing and oscillator frequency accuracies than that present in conventional IEEE 802.11ac communication devices. Therefore, in certain embodiments, in order to allow the mixed bandwidth format to coexist with legacy IEEE 802.11ac communication devices, the AP 110 can transmit a robust modulation-coding scheme (MCS) to a 20 MHz receiver on resource blocks 1, 2, 3 . . . , and 8 when transmitting to an 80 MHz receiver on resource block 17. It should be appreciated that other mitigation techniques can be implemented, such as advanced frequency offset estimation and/or compensation techniques in order to ensure and/or maintain orthogonality of the subcarriers.

As described herein, the A solid format and the A mixed-bandwidth format can permit utilizing one or more allocation sizes to schedule a resource block to communication devices. It can be appreciated that allocation sizes that are multiples of a single elementary allocation size M, e.g., M, 2M, 3M, and so forth, can be more flexible and can permit simpler scheduling. Here, M is a natural number corresponding to a certain number of subcarriers (or tones). Such a modular scheduling also can reduce the number of leftover tones in the case of mixed-bandwidth format. For example, in an embodiment in which 1008 allocable tones are available or otherwise considered, an elementary allocation size M=56 tones can permit up to 18 allocations of M tones, without any unused tones in the A solid format. In one example, in certain bands for wireless communications, M=56 can span 5 MHz. In embodiments in which Δ=80 MHz, Δ'=40 MHz, and Δ"=20 MHz, it should be appreciated that M=56 also can permit reuse of 20 MHz resource blocks. In addition or in other embodiments, in wireless communications that leverage mixed mode of operation with 20 MHz OFDMA single-user (SU) multiple-input multiple-output (MIMO) (SU-MIMO) and/or multi-user MIMO (MU-MIMO); and/or 40 MHz SU-MIMO/MU-MIMO (with 20/40 MHz analog filtering), certain allocation sizes, such as 4M=4×56 (or 8M=8×56), do not provide the most efficient use of 20 MHz and/or 40 MHz bandwidth. As such, novel single-user allocations can be preferred, such as a 242-tone allocation (shown in FIG. 7) which is not a multiple of 56. Therefore, in certain embodiments of this disclosure, allocation sizes that can satisfactorily utilize the available 80 MHz bandwidth were searched, via an application module executed on a computing device, subject to the following constraints:

Reuse of IEEE 802.11ac 20 MHz, 40 MHz, and 80 MHz blocks

Efficient utilization of 20 MHZ and/or 40 MHZ bandwidth

Constraints on numerology for block convolutional coding (BCC) MCS and interleaver block sizes FIG. 7 presents a table 700 including examples of allocation sizes in accordance with one or more embodiments of the disclosure. Specifically, example allocation sizes are shown for $N_A$=1008 and $N_A$=996 allocable tones, which are a number of allocable tones suitable for a 1024-point discrete FFT. For BCC, the number of data tones and pilot tones are shown. The number of data tones can be selected to meet constraints on the MCS and interleaver block sizes, and thus, the number of pilots also can be determined. In case of LDPC convolutional coding, a similar number of data/pilot tones can be utilized. In the alternative, in certain implementations, the number of data/pilot tones can be searched with restriction to obtaining a satisfactory telecommunications performance while maintaining the same number of total tones. For instance, the number of data/pilot tones can be searched so as to maximize performance. In this context, performance refers to, in one aspect, to indicators such as packet error rate (PER) vs. signal-to-noise ratio (SNR). As such, in one example, a satisfactory performance can be achieved for a certain number of data tones and pilot tones that provide a satisfactory PER vs. SNR. It should be appreciated that pilot tones are known information to both a transmitter device (e.g., a communication device that sends a wireless transmission) and a receiver device (e.g., a communication device that receives a wireless transmission). Therefore, in one aspect, the greater the number of pilots, the greater the communication overhead. It can be appreciated that, in certain embodiments, in order to determine a suitable number of data tones and/or pilot tones, PER vs. SNR or other performance metrics can be evaluated for various combinations of data tones and pilot tones until a satisfactory performance is selected or otherwise determined. It can be further appreciated that the performance also can be compared to the overhead incurred by a specific combination of data tones and pilot tones in order to select or otherwise determine a satisfactory combination of data tones and pilot tones. It should be appreciated that with the exception of M'=1008, the other exemplified allocation sizes are not a multiple of M=56. It should be appreciated that the embodiment in which 996 tones are relied upon in the mixed bandwidth format can simplify the implementation of scheduling and communication because they can relax filtering requirements for bandwidth Δ (e.g., 80 MHz) due to larger guards (e.g., 12+11 allocated null subcarriers) at sub-channel and band edges.

It should be appreciated that the disclosure is not limited to the allocation sizes illustrated in FIG. 7, and other allocation sizes are contemplated. For example, for $N_A$=1008, for example, the following allocation sizes can be considered: $M_1$=52, $M_2$=104, $M_3$=208, $M_4$=416, and $M_5$=1008. More generally, in addition or as an alternative to 1008, any allocation sizes within the following ranges can be selected: 56±6, 106±6, 236±6, 236±6, and/or 500±6.

As described herein, for a group of allocation sizes, various combinations can be formed in order to generate resource block allocations for one or more communication devices. Certain combinations can efficiently utilize the entire group of allocable tones (which may be referred to as having "full coverage" of the channel width). Other combinations can provide less than full coverage and can yield a certain number of leftover tones that remain unscheduled. As such, in operation, the AP 110 can utilize or otherwise leverage numerous scheduling modes for allocating resource blocks to one or more communication devices. Each of the scheduling modes correspond to a combination of allocation sizes that yield a number of leftover tones that is below a predetermined threshold. More specifically, for a given set of allocation sizes $\{M_1, M_2, \ldots, M_{K-1}, M_K, M_{K+1}, \ldots, M_N\}$, where $M_\lambda$ is a natural number corresponding to a predetermined number of tones, and $M_N$=$N_A$, a search of all possible combinations of allocations can be performed and an initial group of scheduling modes can be generated. For example, the set of allocation sizes can correspond to the five allocation sizes shown in table 700 for BCC and $N_A$=1008: {56, 106, 236, 500, 1008}. The initial group can be refined by selecting or otherwise determining as scheduling modes for operation (e.g., wireless transmission and/or reception) those modes in the initial group that yield a number of leftover tones below a threshold.

As an illustration, based on the allocation sizes presented in FIG. 7, several scheduling modes in the case of 1008 allocable tones are shown in FIG. 8. The scheduling modes are index for the sake of clarity. Of the illustrated scheduling modes, 14 modes: 1-6, 13-17, and 20-22 (all shown in black color font) provide about 95% OFDMA packing efficiency, e.g., average utilization of 957.7 data tones, with the number of leftover tones being less than 15. Other scheduling modes: 7-12 and 18-19 (presented in gray color font) have more than 15 leftover tones and, thus, a lower OFDMA packing efficiency. Therefore, in one aspect, such modes are excluded from operations—in other words, the AP 110 does not utilize such modes for scheduling resource blocks for one or more communication devices. In certain implementations, the OFDMA packing efficiency can be computed or otherwise determined by identifying the number of data tones for each allocation size, e.g., allocation sizes shown in FIG. 7. The number of data tones for each allocation in a scheduling mode can be utilized to compute or otherwise determine an average of the total "data tone" allocations. To that end, in one aspect, the number of allocations in each scheduling mode can be multiplied by the corresponding number of data tones. The resulting number can be normalized (e.g., divided) by 14 (the number of scheduling modes) in order to obtain such an average. The OFDMA packing efficiency can be computed as the average divided by the number of usable tones (e.g., 1008). It should be appreciated that such an analysis is applied to BCC.

It can be gleaned from FIG. 8 that the illustrated search and selection of scheduling modes excludes certain combinations. For example, in operation, there is no scheduling mode to provide three 236-tone allocations. See, e.g., the scheduling modes 8 and 11, shown in the gray-color font and marked with respective open-head arrows. In order to address such exclusion, the size allocation of 236 tones can be replaced with a size allocation of 238 tones, including 228 data tones (as in the 236-tone allocation) and 10 pilots. Accordingly, the set of allocation sizes is {56, 106, 238, 500, 1008} (see FIG. 9), and several scheduling modes can be generated by searching possible combinations of the elements in such a set. In scenarios in which the criteria to select a scheduling mode for operations is that the selection mode yields less than 15 leftover tones (same criteria applied in connection with FIG. 8), new scheduling modes for operations can be determined. FIG. 9 presents examples of such alternative scheduling modes for operations. The scheduling modes are index for the sake of clarity. Scheduling modes 1-4, 11, 13-16, and 20-21, shown in black-color font, can be utilized for operations, whereas modes 5-10, 12, and 17-19, may not be utilized for operations due to a lesser OFDMA packing efficiency. The average number of data tones for the example scheduling modes for operations in FIG. 9 is 956.9 with again 95% of OFDMA packing efficiency. It can be gleaned from FIG. 9 that that eliminating those combinations that result in a large number of leftover tones would provide a similar OFDMA packing efficiency. Therefore, the outlined approach to search and generate scheduling modes can provide enough flexibility to search for alternative allocation sizes to those presented in FIG. 8, for example, and to find desired scheduling modes with large OFDMA packing efficiency.

FIG. 10 presents other examples of scheduling modes in solid format in accordance with one or more embodiments of the disclosure. The scheduling modes are index for the sake of clarity. The examples are obtained from the set of allocation sizes for 996 allocable tones that is shown in FIG. 7: {55, 110, 242, 498, 996}. Similar to the example scheduling modes shown in FIG. 8, some of the scheduling modes shown in FIG. 10 do not satisfy a predetermined threshold of leftover tones (e.g., 15 tones), and thus, are excluded as scheduling modes for operations—see, e.g., scheduling modes 4, 10, and 19, shown in the gray-color font. Scheduling modes for operations (e.g., wireless transmission and/or reception) provide about 94.2% OFDMA packing efficiency with 938.6 data tones and 8.8 leftover tones on average. The illustrated scheduling modes for operations have indices 1-3, 5-9, 11-18, and 20-24, and are shown in black-color font.

As described herein, the allocation sizes of M, 2M, 3M, . . . , (Q/M)×M can systematically reduce the number of leftover tones due to their modularity. Here, Q is the total number of allocable tones. Yet, in certain embodiments, a more general search for scheduling modes for a specific set of allocation sizes, e.g., {56, 106, 236, 500}, can be performed to optimize efficiency not only for Δ (e.g., 80 MHz) but also for Δ' (e.g., 20 MHz) and Δ" (e.g., 40 MHz) bandwidths of operation. As further described herein, such a search can be performed constrained to the BCC requirement for data tones and pilot tones, and considering the reuse of 802.11ac architecture. As a result, in mixed bandwidth format, certain scheduling modes can yield a larger number of leftover tones than the threshold of tones utilized for selection of scheduling modes of solid format. Accordingly, the scheduling modes that may be rejected for scheduling in solid format can be selected and, thus, relied upon for scheduling in mixed bandwidth format. More particularly, for example, if freedom of scheduling Δ' (e.g., 20 MHz) and Δ" (e.g., 40 MHz) bandwidths operation is contemplated regardless of scheduling modes of solid format, then certain scheduling modes with larger number of leftover tones can be suitable for scheduling mode of mixed bandwidth format. FIG. 11 presents example scheduling modes in mixed bandwidth format with 1008 allocable tones in accordance with one or more embodiments of the disclosure. Similarly to FIGS. 8-10, scheduling modes presented in gray color may not be utilized in operation of an access point or other type of communication device.

Four allocation sizes—56 tones, 106 tones, 236 tones, and 500 tones—are relied on for resource block allocations.

In FIG. 11, the five resource block allocations 1110 can include two allocations having 106-tone size, one allocation of 236-tone size, and one allocation having 500-tone size. Such a resource block allocations can yield 60 leftover (or unused) tones. As described in connection with FIG. 6, in mixed bandwidth format such tones may be allocated or otherwise scheduled to a communication device having operating bandwidth Δ, which can be greater than Δ" (e.g., 20 MHz) and Δ' (e.g., 40 MHz). As such, an additional allocation of 56 tones, which can be non-contiguous (see, e.g., FIG. 6), can be included in the five resource block allocations 1110. Inclusion of such an allocation can utilize the available channel width more effectively, reducing the number of unused tones from 60 to 4. Similar allocations can be included in the resource block allocations 1120, 1130, 1140, 1150, 1160, and 1170, each providing various levels of reduction of unused tones, e.g., greater efficiency utilization of the available bandwidth. In particular, the 18 resource block allocations 1170 can embody or otherwise correspond to the MU resource allocations 440b and 610 shown in FIG. 6. Accordingly, allocations 1170 can permit concurrent or nearly concurrent operation of two communication devices having operating bandwidth Δ and 16 communication devices having operating bandwidth Δ". In one example, Δ=80 MHz and Δ"=20 MHz, and thus, two HEW devices can operate concurrently with legacy 802.11ac devices.

Figure 12:
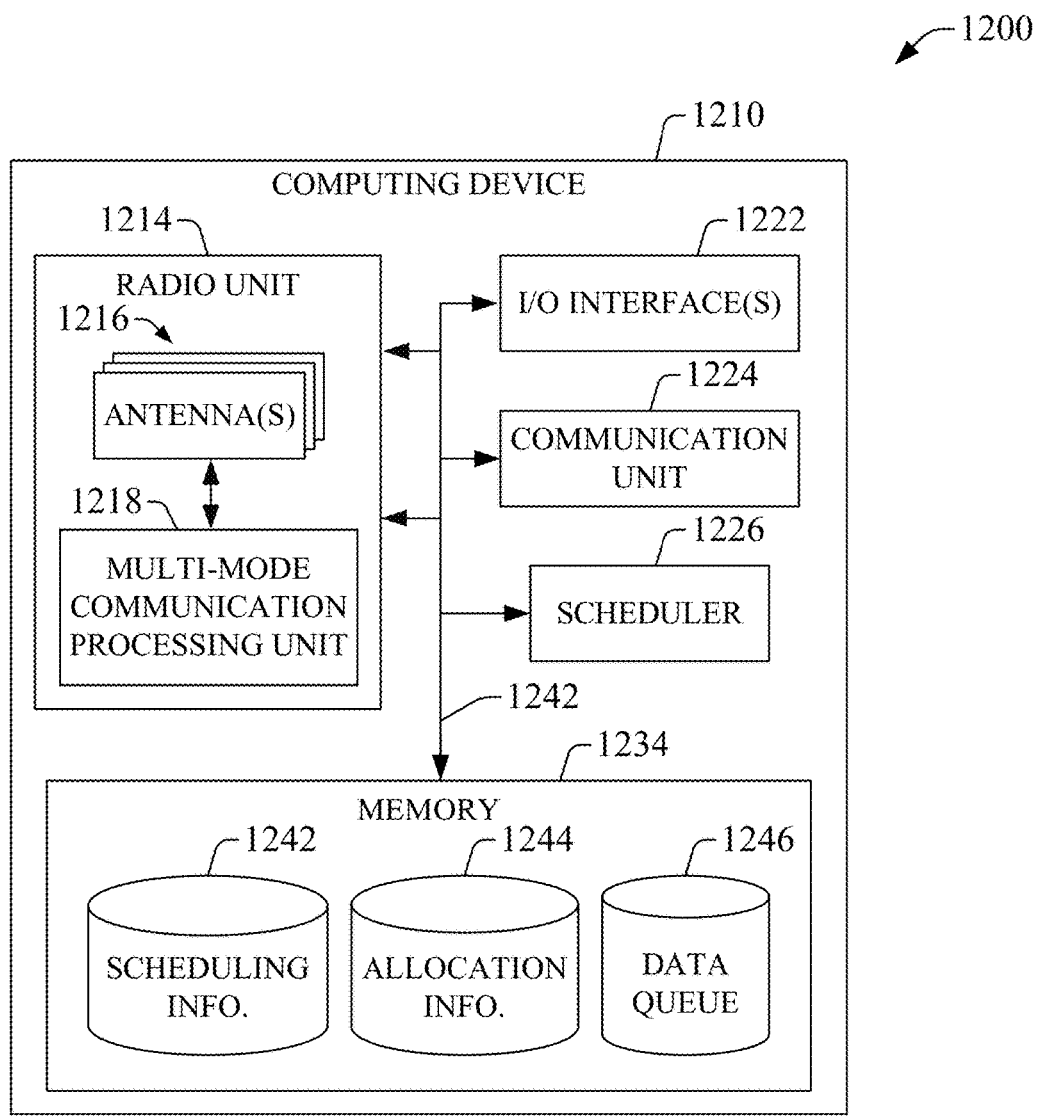
FIG. 12 presents an example of a communication device in accordance with one or more embodiments of the disclosure.

FIG. 12 illustrates a block-diagram of an example embodiment 1200 of a computing device 1210 that can operate in accordance with at least certain aspects of the disclosure. In one aspect, the computing device 1210 can operate as a wireless device and can embody or can comprise an access point, such as AP 110, or another type of communication device (e.g., user equipment or station) in accordance with this disclosure. To permit wireless communication, including the scheduling of resource block allocations as described herein, the computing device 1210 includes a radio unit 1214 and a communication unit 1224. In certain implementations, the communication unit 1224 can generate packets or other types of information blocks via a network stack, for example, and can convey the packets or other types of information block to the radio unit 1214 for wireless communication. In one embodiment, the network stack (not shown) can be embodied in or can constitute a library or other type of programming module, and the communication unit 1224 can execute the network stack in order to generate a packet or other type of information block. Generation of the packet or the information block can include, for example, generation of control information (e.g., checksum data, communication address(es)), traffic information (e.g., payload data), and/or formatting of such information into a specific packet header.

As illustrated, the radio unit 1214 can include one or more antennas 1216 and a multi-mode communication processing unit 1218. In certain embodiments, the antenna(s) 1216 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 1216 can be physically separated to leverage spatial diversity and related different channel characteristics associated with such diversity. In addition or in other embodiments, the multi-mode communication processing unit 1218 can process at least wireless signals in accordance with one or more radio technology protocols and/or modes (such as MIMO, single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include $3^{rd}$ Generation Partnership Project (3GPP) Universal Mobile Telecommunication System (UMTS); 3GPP Long Term Evolution (LTE); LTE Advanced (LTE-A); Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 1218 also can process non-wireless signals (analogic, digital, a combination thereof, or the like). While illustrated as separate blocks in the computing device 1210, it should be appreciated that in certain embodiments, at least a portion of the multi-mode communication processing unit 1218 and the communication unit 1224 can be integrated into a single unit (e.g., a single chipset or other type of solid state circuitry).

Figure 13:
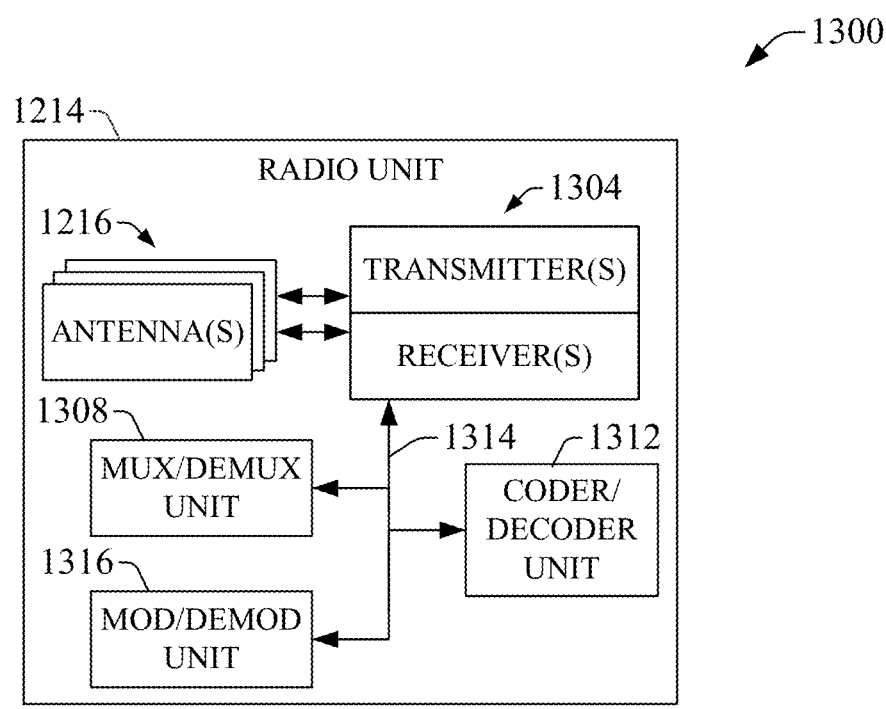
FIG. 13 presents an example of a radio unit in accordance with one or more embodiments of the disclosure.

In one embodiment, e.g., example embodiment 1300 shown in FIG. 13, the radio unit 1214 can comprise a set of one or more transmitters/receivers 1304, and components therein (amplifiers, filters, analog-to-digital (AID) converters, etc.), functionally coupled to a multiplexer/demultiplexer (mux/demux) unit 1308, a modulator/demodulator (mod/demod) unit 1316 (also referred to as modem 1316), and a coder/decoder unit 1312 (also referred to as codec 1312). Each of the transmitter(s)/receiver(s) can form respective transceiver(s) that can transmit and receive wireless signal (e.g., electromagnetic radiation) via the one or more antennas 1216. It should be appreciated that in other embodiments, the radio unit 1214 can include other functional elements, such as one or more sensors, a sensor hub, an offload engine or unit, a combination thereof, or the like.

Electronic components and associated circuitry, such as mux/demux unit 1308, codec 1312, and modem 1316 can permit or facilitate processing and manipulation, e.g., coding/decoding, deciphering, and/or modulation/demodulation, of signal(s) received by the computing device 1210 and signal(s) to be transmitted by the computing device 1210. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as the IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 1304, can exchange information (e.g., data, metadata, code instructions, signaling and related payload data, combinations thereof, or the like) through a bus 1314, which can embody or can comprise at least one of a system bus, an address bus, a data bus, a message bus, a reference link or interface, a combination thereof, or the like. Each of the one or more receivers/transmitters 1304 can convert signal from analog to digital and vice versa. In addition or in the alternative, the receiver(s)/transmitter(s) 1304 can divide a single data stream into multiple parallel data streams, or perform the reciprocal operation. Such operations may be conducted as part of various multiplexing schemes. As illustrated, the mux/demux unit 1308 is functionally coupled to the one or more receivers/transmitters 1304 and can permit processing of signals in time and frequency domain. In one aspect, the mux/demux unit 1308 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), or space division multiplexing (SDM). In addition or in the alternative, in another aspect, the mux/demux unit 1308 can scramble and spread information (e.g., codes) according to most any code, such as Hadamard-Walsh codes, Baker codes, Kasami codes, polyphase codes, and the like. The modem 1316 can modulate and demodulate information (e.g., data, metadata, signaling, or a combination thereof) according to various modulation techniques, such as frequency modulation (e.g., frequency-shift keying), amplitude modulation (e.g., Q-ary quadrature amplitude modulation (QAM), with Q a positive integer; amplitude-shift keying (ASK)), phase-shift keying (PSK), and the like). In addition, processor(s) that can be included in the computing device 1310 (e.g., processor(s) included in the radio unit 1214 or other functional element(s) of the computing device 1210) can permit processing data (e.g., symbols, bits, or chips) for multiplexing/demultiplexing, modulation/demodulation (such as implementing direct and inverse fast Fourier transforms), selection of modulation rates, selection of data packet formats, inter-packet times, and the like.

The codec 1312 can operate on information (e.g., data, metadata, signaling, or a combination thereof) in accordance with one or more coding/decoding schemes suitable for communication, at least in part, through the one or more transceivers formed from respective transmitter(s)/receiver(s) 1304. In one aspect, such coding/decoding schemes, or related procedure(s), can be retained as a group of one or more computer-accessible instructions (computer-readable instructions, computer-executable instructions, or a combination thereof) in one or more memory devices 1234 (referred to as memory 1234). In a scenario in which wireless communication among the computing device 1210 and another computing device (e.g., a station or other type of user equipment) utilizes MIMO, MISO, SIMO, or SISO operation, the codec 1312 can implement at least one of space-time block coding (STBC) and associated decoding, or space-frequency block coding (SFBC) coding and associated decoding. In addition or in the alternative, the codec 1312 can extract information from data streams coded in accordance with spatial multiplexing scheme. In one aspect, to decode received information (e.g., data, metadata, signaling, or a combination thereof), the codec 1312 can implement at least one of computation of log-likelihood ratios (LLRs) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 1312 can utilize, at least in part, mux/demux unit 1308 and mod/demod unit 1316 to operate in accordance with aspects described herein.

With further reference to FIG. 12, the computing device 1210 can operate in a variety of wireless environments having wireless signals conveyed in different electromagnetic radiation (EM) frequency bands. To at least such end, the multi-mode communication processing unit 1218 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion(s) of the EM spectrum. In one aspect, the set of one or more frequency bands can include at least one of (i) all or most licensed EM frequency bands (such as the industrial, scientific, and medical (ISM) bands, including the 2.4 GHz band or the 5 GHz bands); or (ii) all or most unlicensed frequency bands (such as the 60 GHz band) currently available for telecommunication.

The computing device 1210 can receive and/or transmit information encoded and/or modulated or otherwise processed in accordance with aspects of the present disclosure. To at least such an end, in certain embodiments, the computing device 1210 can acquire or otherwise access information, wirelessly via the radio unit 1214 (also referred to as radio 1214), in scheduled resource blocks according to scheduling modes of the solid format or the mixed bandwidth format described herein. To that end, in the illustrated embodiment, the computing device 1210 includes a scheduler unit 1226 (also referred to as scheduler 1226) that can access scheduling information and can schedule or otherwise allocate a resource block to another communication device (e.g., one of communication devices 130a-130e). The scheduling information can include intended quality-of-service (QoS), such as intended data rate; signal strength; interference level; estimated distance between the other communication device and the computing device 1210; amount of traffic (or data) available or otherwise queued for the communication device being scheduled; and/or other type of scheduling factors. In addition or in other embodiments, the scheduling information can include information indicative or otherwise representative of modulation and coding schemes (MCSs) that may be assigned to a communication device that is being scheduled. The scheduling information can be retained in one or more memory devices 1234 (referred to as memory 1234) within one or more memory elements 1242 (referred to as scheduling info. 1242, which can be embodied in or can include registers, files, databases, and the like). Information indicative or otherwise representative of the traffic available to a communication device to be scheduled by the communication device 1210 also can be retained in the memory 1246 within one or more memory elements 1246 (referred to as data queue 1246).

The computing device 1210 can select or otherwise determine a specific resource block for another communication device. As described herein, the resource block can have a size corresponding to a combination of predetermined allocation sizes, e.g., 56 tones, 106 tones, 236 tones, 500 tones, and 1008 tones. The predetermined allocation sizes can be retained in the memory 1234 within one or more memory elements 1244 (referred to as allocation info. 1244). In addition, the resource block can have contiguous portions of the available spectrum (e.g., resource block 4 shown in panel 440*b* in FIG. 6) or can have non-contiguous portions (e.g., resource block 17 shown in panel 610 in FIG. 6). After the AP 110 has determined the specific resource block, the AP 110 can transmit information, in a scheduling frame, for example, that can indicate the resource block (e.g., 236 tones) allocated to the communication device and the MCS that the communication device is to utilize for wireless transmissions. For communication of traffic and/or signaling, the AP 110, via the communication unit 1224, for example, can form a wireless transmission for the communication device using the determined resource block and related allocation sizes. As described herein, such a transmission can be formed using a solid frame format (see, e.g., FIG. 2) or a mixed-bandwidth frame format (see, e.g., FIG. 6). The communication device that is allocated the resource block can transmit wirelessly in the portion of the operating channel of the device as specified by the resource block. For instance, with reference to FIG. 6, the communication device can be allocated resource block 4 and can form wireless OFDMA transmissions using subcarriers in such a block. Information associated with frame formats (e.g., solid format and mixed bandwidth format), such as number of guard tones, number of DC tones, number of edge tones, and so forth, can be retained in the allocation info. 1244.

In addition to scheduling info. 1242, allocation info. 1244, and data queue 1246, the memory 1234 can contain one or more memory elements having information suitable for processing information received according to a predetermined communication protocol (e.g., IEEE 802.11ac or IEEE 802.11ax). While not shown, in certain embodiments, one or more memory elements of the memory 1234 can include computer-accessible instructions that can be executed by one or more of the functional elements of the computing device 1210 in order to implement at least some of the functionality for bandwidth allocation described herein, including processing of information communicated (e.g., encoded, modulated, and/or arranged) in accordance with aspect of the disclosure. One or more groups of such computer-accessible instructions can embody or can constitute a programming interface that can permit communication of information (e.g., data, metadata, and/or signaling) between functional elements of the computing device 1210 for implementation of such functionality.

As illustrated, the computing device 1210 can include one or more I/O interfaces 1222. At least one of the I/O interface(s) 1222 can permit the exchange of information between the computing device 1210 and another computing device and/or a storage device. Such an exchange can be wireless (e.g., via near field communication or optically-switched communication) or wireline. At least another one of the I/O interface(s) 1222 can permit presenting information visually and/or aurally to an end-user of the computing device 1210. In addition, two or more of the functional elements of the computing device 1210 can exchange information (e.g., data, metadata, code instructions, signaling and related payload data, combinations thereof, or the like) through a bus 1252, which can embody or can comprise at least one of a system bus, an address bus, a data bus, a message bus, a reference link or interface, a combination thereof, or the like. The bus 1252 can include, for example, components for wireline and wireless communication.

It should be appreciated that portions of the computing device 1210 can embody or can constitute an apparatus. For instance, the multi-mode communication processing unit 1218, the communication unit 1224, and at least a portion of the memory 1234 can embody or can constitute an apparatus that can operate in accordance with one or more aspects of this disclosure.

Figure 14:
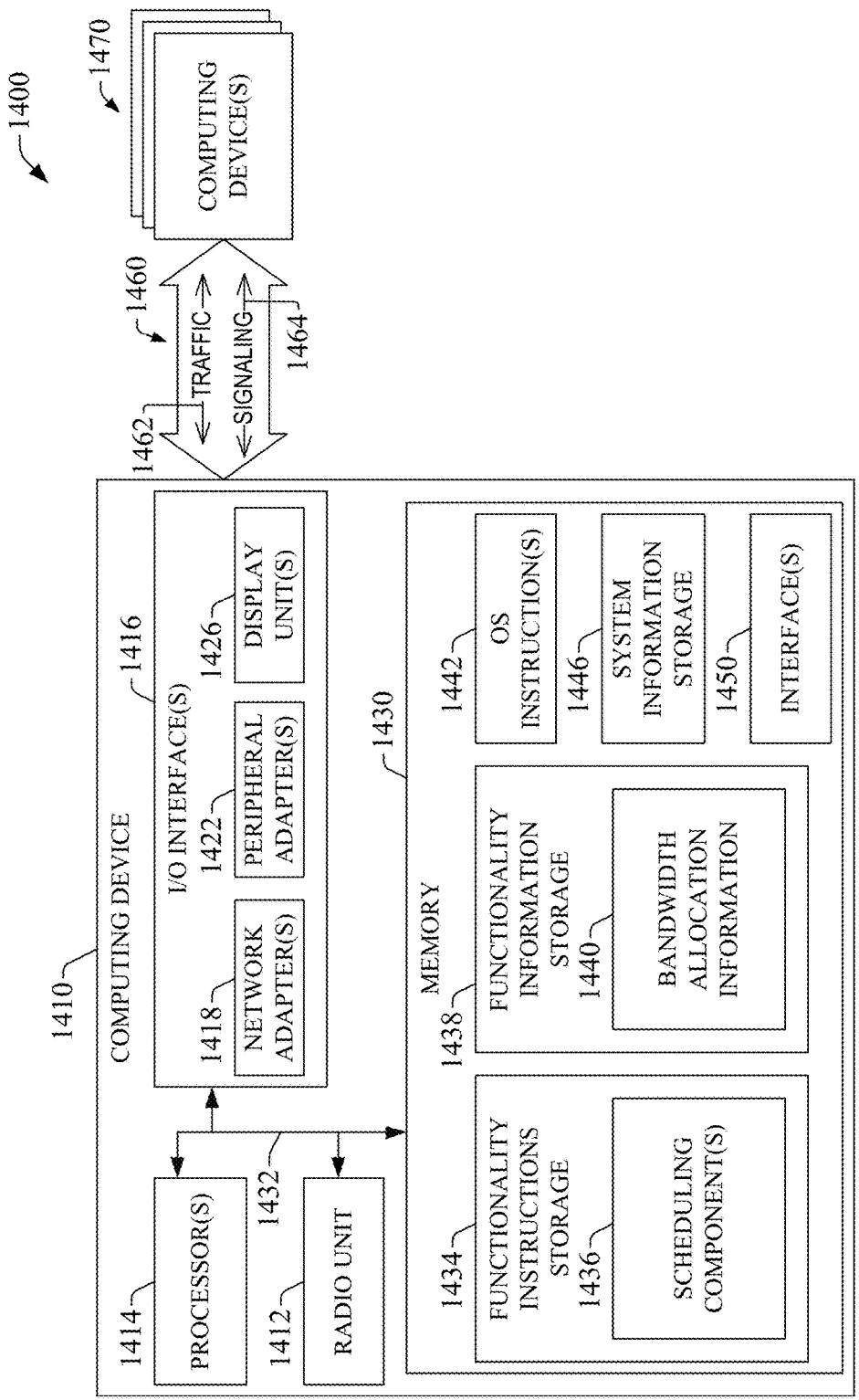
FIG. 14 presents an example of a computational environment in accordance with one or more aspects of the disclosure.

FIG. 14 illustrates an example of a computational environment 1400 that can utilize or otherwise leverage bandwidth allocation for wireless communication in accordance with one or more aspects of the disclosure. The example computational environment 1400 is only illustrative and is not intended to suggest or otherwise convey any limitation as to the scope of use or functionality of such computational environments' architecture. In addition, the computational environment 1400 should not be interpreted as having any dependency or requirement relating to any one or combination of components illustrated in this example computational environment. The illustrative computational environment 1400 can embody or can include an access point (e.g., AP 110) and one or more communication devices of other types (e.g., UE, station(s), or other client device(s)) that can communicate wirelessly via the traffic and signaling links 1460. In one example, the computing device 1410 can embody or can constitute the AP 110; the remote computing device(s) 1470 can embody or can constitute, respectively, the communication devices 130*a*-130*e*; and the traffic and signaling links 1460 can embody the wireless links 140*a*-140*e*.

The computational environment 1400 represents an example of a software implementation of the various aspects or features of the disclosure in which the processing or execution of operations described in connection with the bandwidth allocation described herein, including processing of information communicated (e.g., encoded, modulated, and/or arranged) in accordance with this disclosure, can be performed in response to execution of one or more software components at the computing device 1410. It should be appreciated that the one or more software components can render the computing device 1410, or any other computing device that contains such components, a particular machine for the bandwidth allocation described herein, including processing of information encoded, modulated, and/or arranged in accordance with aspects described herein, among other functional purposes. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can assembled into one or more program modules, for example, that can be compiled, linked, and/or executed at the computing device 1410 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1410 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with bandwidth allocation, including processing of information communicated (e.g., encoded, modulated, and/or arranged) in accordance with features described herein, can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 1410 can comprise one or more processors 1414, one or more input/output (I/O) interfaces 1416, a memory 1430, and a bus architecture 1432 (also termed bus 1432) that functionally couples various functional elements of the computing device 1410. As illustrated, the computing device 1410 also can include a radio unit 1412. In one example, similarly to the radio unit 1214, the radio unit 1412 can include one or more antennas and a communication processing unit that can permit wireless communication between the computing device 1410 and another device, such as one of the computing device(s) 1470. The bus 1432 can include at least one of a system bus, a memory bus, an address bus, or a message bus, and can permit the exchange of information (data, metadata, and/or signaling) between the processor(s) 1414, the I/O interface(s) 1416, and/or the memory 1430, or respective functional element therein. In certain scenarios, the bus 1432 in conjunction with one or more internal programming interfaces 1450 (also referred to as interface(s) 1450) can permit such exchange of information. In scenarios in which the processor(s) 1414 include multiple processors, the computing device 1410 can utilize parallel computing.

The I/O interface(s) 1416 can permit or otherwise facilitate communication of information between the computing device and an external device, such as another computing device, e.g., a network element or an end-user device. Such communication can include direct communication or indirect communication, such as exchange of information between the computing device 1410 and the external device via a network or elements thereof. As illustrated, the I/O interface(s) 1416 can comprise one or more of network adapter(s) 1418, peripheral adapter(s) 1422, and display unit(s) 1426. Such adapter(s) can permit or facilitate connectivity between the external device and one or more of the processor(s) 1414 or the memory 1430. In one aspect, at least one of the network adapter(s) 1418 can couple functionally the computing device 1410 to one or more computing devices 1470 via one or more traffic and signaling links 1460 that can permit or facilitate exchange of traffic 1462 and signaling 1464 between the computing device 1410 and the one or more computing devices 1470. Such network coupling provided at least in part by the at least one of the network adapter(s) 1418 can be implemented in a wired environment, a wireless environment, or both. Therefore, it should be appreciated that in certain embodiments, the functionality of the radio unit 1412 can be provided by a combination of at least one of the network adapter(s) and at least one of the processor(s) 1414. Accordingly, in such embodiments, the radio unit 1412 may not be included in the computing device 1410. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each of the computing device(s) 1470 can have substantially the same architecture as the computing device 1410. In addition or in the alternative, the display unit(s) 1426 can include functional elements (e.g., lights, such as light-emitting diodes; a display, such as liquid crystal display (LCD), combinations thereof, or the like) that can permit control of the operation of the computing device 1410, or can permit conveying or revealing operational conditions of the computing device 1410.

In one aspect, the bus 1432 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnect (PCI) bus, a PCI-Express bus, a Personal Computer Memory Card Industry Association (PCMCIA) bus, a Universal Serial Bus (USB), and the like. The bus 1432, and all buses described herein can be implemented over a wired or wireless network connection and each of the subsystems, including the processor(s) 1414, the memory 1430 and memory elements therein, and the I/O interface(s) 1416 can be contained within one or more remote computing devices 1470 at physically separate locations, connected through buses of this form, in effect implementing a fully distributed system.

The computing device 1410 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1410, and can comprise, for example, both volatile and non-volatile media, and removable and/or non-removable media. In one aspect, the memory 1430 can comprise computer-readable media in the form of volatile memory, such as random access memory (RAM), and/or non-volatile memory, such as read-only memory (ROM).

The memory 1430 can comprise functionality instructions storage 1434 and functionality information storage 1438. The functionality instructions storage 1434 can comprise computer-accessible instructions that, in response to execution (by at least one of the processor(s) 1414), can implement one or more of the functionalities of the disclosure. The computer-accessible instructions can embody or can comprise one or more software components illustrated as scheduling component(s) 1436. In one scenario, execution of at least one component of the scheduling component(s) 1436 can implement one or more of the techniques disclosed herein. For instance, such execution can cause a processor that executes the at least one component to carry out one or more of the disclosed example methods. It should be appreciated that, in one aspect, a processor of the processor(s) 1414 that executes at least one of the scheduling component(s) 1436 can retrieve information from or retain information in a memory element 1440 (referred to as bandwidth allocation information 1440) in the functionality information storage 1438 in order to operate in accordance with the functionality programmed or otherwise configured by the scheduling component(s) 1436. The information that is retained and/or retrieved can include at least one of code instructions, information structures (e.g., data structures and/or metadata structures), or the like. In certain embodiments, the bandwidth allocation information 1440 can include a combination of the scheduling info. 1242, the allocation info. 1244, and the data queue 1246.

At least one of the one or more interfaces 1450 (e.g., application programming interface(s)) can permit or facilitate communication of information between two or more components within the functionality instructions storage 1434. The information that is communicated by the at least one interface can result from implementation of one or more operations in a method of the disclosure. In certain embodiments, one or more of the functionality instructions storage 1434 and the functionality information storage 1438 can be embodied in or can comprise removable/non-removable, and/or volatile/non-volatile computer storage media.

At least a portion of at least one of the scheduling component(s) 1436 or bandwidth allocation information 1440 can program or otherwise configure one or more of the processors 1414 to operate at least in accordance with the functionality described herein. One or more of the processor(s) 1414 can execute at least one of such components and leverage at least a portion of the information in the functionality information storage 1438 in order to provide bandwidth allocation in accordance with one or more aspects described herein. More specifically, yet not exclusively, execution of one or more of the scheduling component(s) 1436 can permit transmitting and/or receiving information by the computing device 1410 according to solid-format frames and/or mixed-bandwidth-format frames and resource block allocations as described herein in connection with FIGS. 2-6, for example. As such, it should be appreciated that in certain embodiments, a combination of the processor(s) 1414, the scheduling component(s) 1436, and the bandwidth allocation information 1440 can form means for providing specific functionality for allocating and/or scheduling resource blocks to a communication device in accordance with one or more aspects of the disclosure.

It should be appreciated that, in certain scenarios, the functionality instruction(s) storage 1434 can embody or can comprise a computer-readable non-transitory storage medium having computer-accessible instructions that, in response to execution, cause at least one processor (e.g., one or more of processor(s) 1414) to perform a group of operations comprising the operations or blocks described in connection with the disclosed methods.

In addition, the memory 1430 can comprise computer-accessible instructions and information (e.g., data and/or metadata) that permit or facilitate operation and/or administration (e.g., upgrades, software installation, any other configuration, or the like) of the computing device 1410. Accordingly, as illustrated, the memory 1430 can comprise a memory element 1442 (labeled OS instruction(s) 1442) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architecture complexity of the computing device 1410 can dictate a suitable OS. The memory 1430 also comprises a system information storage 1446 having data and/or metadata that permits or facilitate operation and/or administration of the computing device 1410.

Elements of the OS instruction(s) 1442 and the system information storage 1446 can be accessible or can be operated on by at least one of the processor(s) 1414.

It should be recognized that while the functionality instructions storage 1434 and other executable program components, such as the operating system (OS) instruction(s) 1442, are illustrated herein as discrete blocks, such software components can reside at various times in different memory components of the computing device 1410, and can be executed by at least one of the processor(s) 1414. In certain scenarios, an implementation of the scheduling component(s) 1436 can be retained on or transmitted across some form of computer readable media.

The computing device 1410 and/or one of the computing device(s) 1470 can include a power supply (not shown), which can power up components or functional elements within such devices. The power supply can be a rechargeable power supply, e.g., a rechargeable battery, and it can include one or more transformers to achieve a power level suitable for operation of the computing device 1410 and/or one of the computing device(s) 1470, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 1418) to connect operationally to the conventional power grid. In another aspect, the power supply can include an energy conversion component, such as a solar panel, to provide additional or alternative power resources or autonomy for the computing device 1410 and/or one of the computing device(s) 1470.

The computing device 1410 can operate in a networked environment by utilizing connections to one or more remote computing devices 1470. As an illustration, a remote computing device can be a personal computer, a portable computer, a server, a router, a network computer, a peer device or other common network node, and so on. As described herein, connections (physical and/or logical) between the computing device 1410 and a computing device of the one or more remote computing devices 1470 can be made via one or more traffic and signaling links 1460, which can comprise wireline link(s) and/or wireless link(s) and several network elements (such as routers or switches, concentrators, servers, and the like) that form a local area network (LAN), a metropolitan area network (MAN), and/or a wide area network (WAN). Such networking environments are conventional and commonplace in dwellings, offices, enterprise-wide computer networks, intranets, local area networks, and wide area networks.

It should be appreciated that portions of the computing device 1410 can embody or can constitute an apparatus. For instance, at least one of the processor(s) 1414, at least a portion of the radio unit 1412, and at least a portion of the memory 1430 can embody or can constitute an apparatus that can operate in accordance with one or more aspects of this disclosure.

Figure 15:
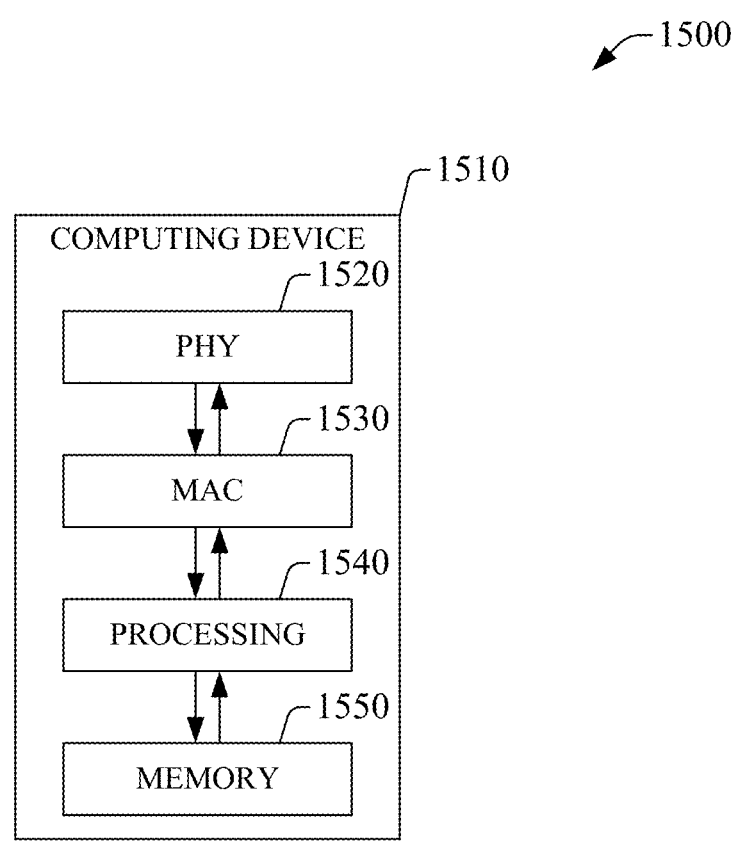
FIG. 15 presents another example of a communication device in accordance with one or more embodiments of the disclosure.

FIG. 15 presents another example embodiment 1500 of a computing device 1510 in accordance with one or more embodiments of the disclosure. In certain embodiments, the computing device 1510 can be a HEW-compliant device that may be configured to communicate with one or more other HEW devices (e.g., communication device 130a shown in FIG. 1), an access point (e.g., AP 110 shown in FIG. 1), and/or other type of communication devices, such as legacy communication devices (e.g., communication device 130b or communication device 130e shown in FIG. 1). HEW devices and legacy devices also may be referred to as HEW stations (STAs) and legacy STAs, respectively. In one implementation, the computing device 1510 can operate as an access point (such as AP 110). As illustrated, the computing device 1510 can include, among other things, physical layer (PHY) circuitry 1520 and medium-access-control layer (MAC) circuitry 1530. In one aspect, the PHY circuitry 1520 and the MAC circuitry 1530 can be HEW compliant layers and also can be compliant with one or more legacy IEEE 802.11 standards. In one aspect, the MAC circuitry 1530 can be arranged to configure physical layer converge protocol (PLCP) protocol data units (PPDUs) and arranged to transmit and receive PPDUs, among other things. In addition or in other embodiments, the computing device 1510 also can include other hardware processing circuitry 1540 (e.g., one or more processors) and one or more memory devices 1550 configured to perform the various operations described herein.

In certain embodiments, the MAC circuitry 1530 can be arranged to contend for a wireless medium during a contention period to receive control of the medium for the HEW control period and configure an HEW PPDU. In addition or in other embodiments, the PHY circuitry 1520 can be arranged to transmit the HEW PPDU. The PHY circuitry 1520 can include circuitry for modulation/demodulation, upconversion/downconversion, filtering, amplification, etc. As such, the computing device 1510 can include a transceiver to transmit and receive data such as HEW PPDU. In certain embodiments, the hardware processing circuitry 1540 can include one or more processors. The hardware processing circuitry 1540 can be configured to perform functions based on instructions being stored in a memory device (e.g., RAM or ROM) or based on special purpose circuitry. In certain embodiments, the hardware processing circuitry 1540 can be configured to perform one or more of the functions described herein, such as allocating bandwidth or receiving allocations of bandwidth.

In certain embodiments, one or more antennas may be coupled to or included in the PHY circuitry 1520. The antenna(s) can be transmit and receive wireless signals, including transmission of HEW packets. As described herein, the one or more antennas can include one or more directional or omnidirectional antennas, including dipole antennas, monopole antennas, patch antennas, loop antennas, microstrip antennas, or other types of antennas suitable for transmission of RF signals. In scenarios in which MIMO communication is utilized, the antennas may be physically separated to leverage spatial diversity and the different channel characteristics that may result.

The memory 1550 may store information for configuring the other circuitry to perform operations for configuring and transmitting HEW packets or other types of radio packets, and performing the various operations described herein including the allocation of and use of bandwidth (e.g., as it may be the case in an AP) and use of the allocation of the bandwidth (e.g., as it may be the case in a STA).

The computing device 1510 can be configured to communicate using OFDM communication signals over a multicarrier communication channel. More specifically, in certain embodiments, the computing device 1510 can be configured to communicate in accordance with one or more specific radio technology protocols, such as the IEEE family of standards including IEEE 802.11a, 802.11n, 802.11ac, 802.11ax, DensiFi, and/or proposed specifications for WLANs. In one of such embodiments, the computing device 1510 can utilize or otherwise rely on symbols having a duration that is four times the symbol duration of 802.11n and/or 802.11ac. It should be appreciated that the disclosure is not limited in this respect and, in certain embodiments, the computing device 1510 also can transmit and/or receive wireless communications in accordance with other protocols and/or standards.

The computing device 1510 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other types of communication devices that may receive and/or transmit information wirelessly. Similarly to the computing device 1410, the computing device 1510 can include, for example, one or more of a keyboard, a display, a non-volatile memory port, multiple antennas, a graphics processor, an application processor, speakers, and other mobile device elements. The display may be an LCD screen including a touch screen.

It should be appreciated that while the computing device 1510 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors. It should further be appreciated that portions of the computing device 1510 can embody or can constitute an apparatus. For example, the processing circuitry 1540 and the memory 1550 can embody or can constitute an apparatus that can operate in accordance with one or more aspects of this disclosure. For another example, the processing circuitry 1540, the PHY circuitry 1520, and the memory 1550 can embody or can constitute an apparatus that can operate in accordance with one or more aspects of this disclosure.

Figure 16:
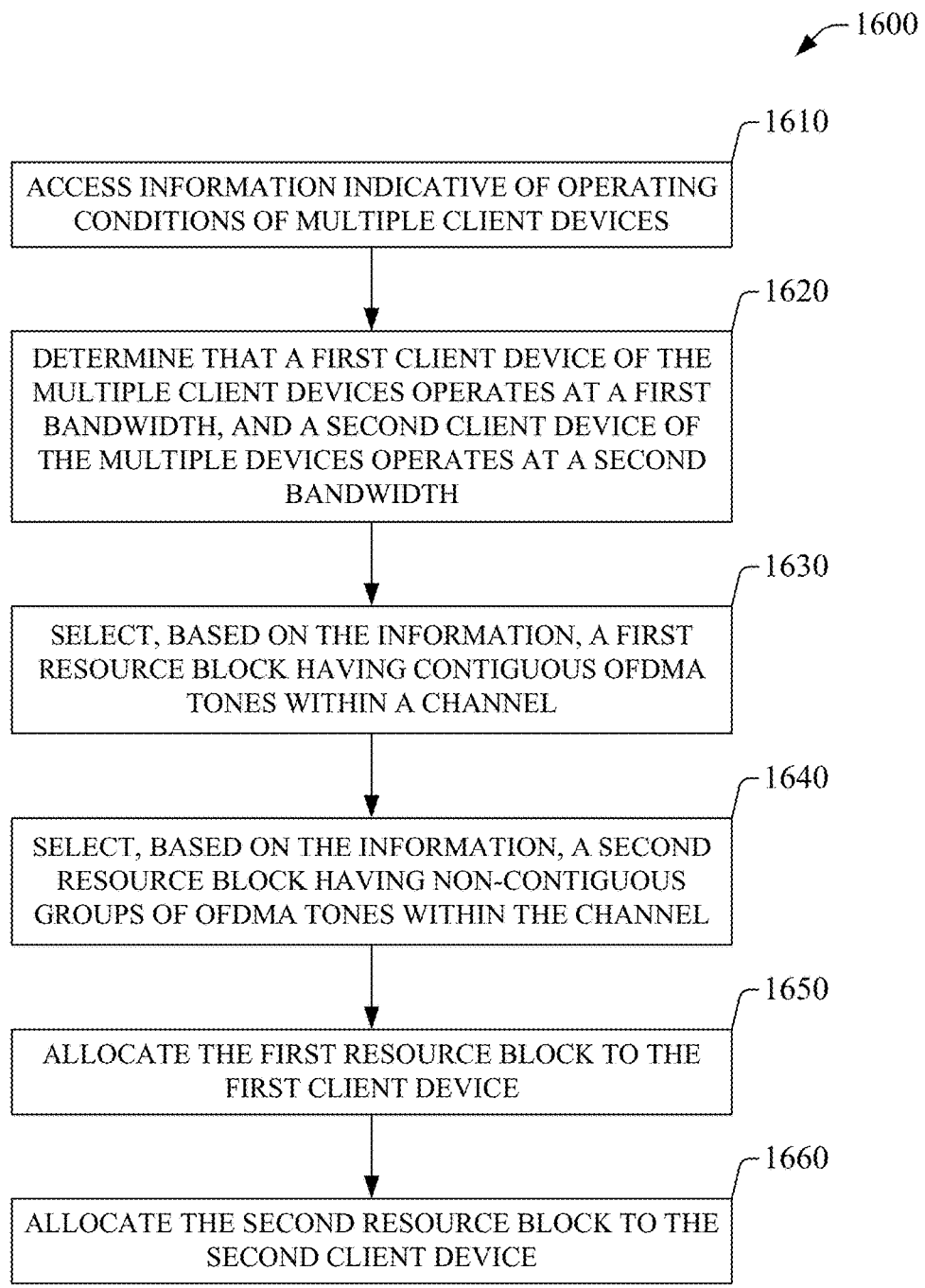
FIG. 16 presents an example method in accordance with one or more embodiments of the disclosure.

In view of the aspects described herein, various techniques for resource block allocation in telecommunications contemplating communication devices that can operate according to different operating bandwidth can be implemented in accordance with the disclosure. An example of such techniques can be better appreciated with reference to the flowchart in FIG. 16. For purposes of simplicity of explanation, the example method disclosed with reference to FIG. 16 is presented and described as a series of blocks (with each block representing an action or an operation in a method, for example). However, it is to be understood and appreciated that such an example method or any other technique is not limited by the order of blocks and associated actions or operations, as some blocks may occur in different orders and/or concurrently with other blocks from those that are shown and described herein. For example, the methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the techniques of the disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer- or machine-readable medium, to implement the one or more methods. The code instructions can provide a computer-executable or machine-executable framework to implement the techniques described herein.

FIG. 16 presents a flowchart of an example method 1600 for bandwidth allocation in accordance with one or more embodiments of the disclosure. At block 1610, a communication device (e.g., an access point or a router integrated therein) can access information indicative of operating conditions of multiple client devices. The communication device can access such information wirelessly, in one or more frames received from the multiple client devices. At block 1620, the communication device can determine that a first client device of the multiple client devices operates at a first bandwidth (e.g., 20 MHz or 40 MHz), and that a second client device of the multiple client devices operates at a second bandwidth (e.g., 80 MHz). As illustrated, the second bandwidth is greater than the first bandwidth. As described herein, at block 1620, the communication device determines that the first and second devices operate in a mixed bandwidth environment. At block 1630, the communication device can select, based at least on a portion of the information, a first resource block having contiguous OFDMA tones within a channel. As described herein, the channel can have a spectral width that is equal to the larger of the first bandwidth and the second bandwidth. At block 1640, the communication device can select, based at least on a portion of the accessed information, a second resource block having non-contiguous groups of OFDMA tones within the channel.

At block 1650, the communication device can allocate the first resource block to the first client device. At block 1660, the communication device can allocate the second resource block to the second client device.

Additional or alternative embodiments emerge from the foregoing description and the annexed drawings. In certain embodiments, the disclosure provides an apparatus for bandwidth allocation in mixed bandwidth telecommunication environments. The apparatus can include at least one memory devices having instructions encoded thereon; and at least one processor coupled to the one or more memory devices and configured, by the instructions, to access information indicative of operating conditions of multiple client devices; and to schedule multiple orthogonal frequency division multiple access (OFDMA) tones for communication to at least one of the multiple client devices using at least a portion of the information. In one aspect, the multiple OFDMA tones are arranged within a resource block having a spectral width of about 80 MHz, and the resource block can include one or more of (i) a channel having a spectral width of about 80 MHz, (ii) a first sub-channel having a spectral width of about 40 MHz, or (iii) a second sub-channel having a spectral width of about 20 MHz.

In addition or in other embodiments of the apparatus, the at least one processor can be further configured to generate a wireless transmission for the at least one of the multiple client devices using the scheduled OFDMA tones, and to send the wireless transmission to the at least one of the multiple client devices.

In addition or in other embodiments of the apparatus, the at least one processor can be further configured to send resource allocation information indicative of the scheduled OFDMA tones to the at least one of the multiple client devices, and to receive a wireless transmission from the at least one of the multiple client devices in the scheduled OFDMA tones.

In addition or in other embodiments of the apparatus, each of the multiple client devices can have an operating bandwidth of about 80 MHz, and the at least one processor can be further configured, by the instructions, to schedule the multiple OFDMA tones within the channel. In certain implementations, the channel can include 1008 non-null OFDMA tones, six null tones forming a first edge of the channel, five null tones forming a second edge of the channel, and five null tones for direct conversion at about the center of the channel. In one of such implementations or in other implementations, the at least one processor can be further configured, by the instructions, to select the multiple OFDMA tones from the set of 1008 allocable OFDMA tones. In addition or in other embodiments, the at least one processor can be further configured, by the instructions, to select at least one block of OFDMA tones from the set of 1008 allocable OFDMA tones, the at least one block comprising 56 OFDMA tones, 106 OFDMA tones, 236 OFDMA tones, 486 OFDMA tones, 500 OFDMA tones, or 1008 OFDMA tones.

In additional or in other implementations, the channel can include 996 non-null OFDMA tones, 12 null tones forming a first edge of the first channel, 11 null tones forming a second edge of the first channel, and five null tones for direct conversion at about the center of the first channel. In one of such implementations or in yet other implementations, the at least one processor can be further configured, by the instructions, to select the multiple OFDMA tones from the set of 996 allocable OFDMA tones. In addition or in other embodiments, the at least one processor is further configured, by the instructions, to select at least one block of OFDMA tones from the set of 996 allocable OFDMA tones, the at least one block comprising 55 OFDMA tones, 110 OFDMA tones, 242 OFDMA tones, 498 OFDMA tones, or 996 OFDMA tones.

In addition or in other embodiments of the apparatus, the resource block can further include the second sub-channel and three other sub-channels, each of the sub-channel and the three other sub-channels having a spectral width of about 20 MHz and five null tones for direct conversion. In certain implementations, the resource block can further include the first sub-channel, the second sub-channel, and a third sub-channel having a spectral width of about 20 MHz, where each of the first sub-channel, the second sub-channel, and the third sub-channel comprises five null tones for direct current.

In addition or in other embodiments of the apparatus, the resource block can further include the first sub-channel and a third sub-channel having a spectral width of about 40 MHz, where each of the first sub-channel and the third sub-channel comprises five null tones for direct conversion.

In addition or in other embodiments of the apparatus, the at least one of the multiple client devices can include a first client device having an operating bandwidth of about 20 MHz and a second client device having an operating bandwidth of about 80 MHz. In addition, in certain implementations, the at least one processor can be further configured, by the instructions, to schedule a first portion of the multiple OFDMA tones to the first client device in a block of contiguous tones, and a second portion of the multiple OFDMA tones to the second client device within two or more non-contiguous blocks of tones of the channel.

In addition or in other embodiments of the apparatus, the at least one of the multiple client devices can include a first client device having an operating bandwidth of about 40 MHz and a second client device having an operating bandwidth of about 80 MHz. In addition, in certain implementations, the at least one processor can be further configured, by the instructions, to schedule a first portion of the multiple OFDMA tones to the first client device in a block of contiguous tones, and a second portion of the multiple OFDMA tones to the second client device within two or more non-contiguous blocks of tones of the channel. In certain implementations, the second portion of the multiple OFDMA tones includes tones non-allocable to the first client device.

In addition or in other embodiments, the apparatus can be embodied in or can constitute a wireless access point that can operate according to the Institute of Electrical and Electronics Engineers (IEEE) 802.11ax standard.

In certain embodiments, the disclosure can provide a method for bandwidth allocation in mixed bandwidth telecommunication environments. The method can include accessing, by a communication device, information indicative of operating conditions of multiple client devices; determining, by the communication device, that a first client device of the multiple client devices operates at a first bandwidth and a second client device operates at a second bandwidth, the second bandwidth is greater than the first bandwidth; selecting, at the computing device, based on the information, a first resource block having contiguous orthogonal frequency division multiple access (OFDMA) tones within a channel having a spectral width equal to the second bandwidth; selecting, by the computing device, based on the information, a second resource block having non-contiguous groups of OFDMA tones within the channel, the tones in the second resource block are non-allocable to the first client device; allocating, by the computing device, the first resource block to the first client device; and allocating, by the computing device, the second resource block to the second client device.

In addition or in other embodiments, the method can further include generating, by the computing device, a wireless transmission for the first client device using the first resource block, and sending, by the computing device, the wireless transmission to the first client device.

In addition or in other embodiments, the method can further include generating, by the computing device, a wireless transmission for the second client device using the second resource block, and sending, by the computing device, the wireless transmission to the second client device.

In addition or in other embodiments, the method can further include sending, by the computing device, resource allocation information indicative of the first resource block to the first client device, and receiving, by the computing device, a wireless transmission from the first client device in the allocated first resource block.

In addition or in other embodiments, the method can further include sending, by the computing device, resource allocation information indicative of the second resource block to the second client device, and receiving, by the computing device, a wireless transmission from the second client device in the allocated first resource block.

In addition or in other embodiments of the method, determining, by the communication device, that the first client device of the multiple client devices operates at the first bandwidth and the second client device operates at the second bandwidth can include determining that the first client device operates at a bandwidth of 20 MHz and the second client device operates at a bandwidth of 80 MHz.

In addition or in other embodiments of the method, determining, by the communication device, that the first client device of the multiple client devices operates at the first bandwidth and the second client device operates at the second bandwidth can include determining that the first client device operates at a bandwidth of 40 MHz and the second client device operates at a bandwidth of 80 MHz.

In certain embodiments, the disclosure provides at least one computer-readable non-transitory storage medium having instructions encoded therein that, in response to execution, cause a device to perform instructions including: accessing information indicative of operating conditions of multiple client devices; determining that a first client device of the multiple client devices operates at a first bandwidth and a second client device operates at a second bandwidth, the second bandwidth is greater than the first bandwidth; selecting based on the information, a first resource block having contiguous orthogonal frequency division multiple access (OFDMA) tones within a channel having a spectral width equal to the second bandwidth; selecting based on the information, a second resource block having non-contiguous groups of OFDMA tones within the channel, the tones in the second resource block are non-allocable to the first client device; allocating the first resource block to the first client device; and allocating the second resource block to the second client device.

In addition or in other embodiments of the at least one computer-readable non-transitory storage medium, the operations can further include generating a wireless transmission for the first client device using the first resource block, and sending the wireless transmission to the first client device.

In addition or in other embodiments of the at least one computer-readable non-transitory storage medium, the operations can further include generating a wireless transmission for the second client device using the second resource block, and sending the wireless transmission to the second client device.

In addition or in other embodiments of the at least one computer-readable non-transitory storage medium, the operations can further include sending resource allocation information indicative of the first resource block to the first client device, and receiving a wireless transmission from the first client device in the allocated first resource block.

In addition or in other embodiments, of the at least one computer-readable non-transitory storage medium, the operations can further include sending resource allocation information indicative of the second resource block to the second client device, and receiving a wireless transmission from the second client device in the allocated first resource block.

In addition or in other embodiments of the at least one computer-readable non-transitory storage medium, determining that the first client device of the multiple client devices operates at the first bandwidth and the second client device operates at the second bandwidth can include determining that the first client device operates at a bandwidth of 20 MHz and the second client device operates at a bandwidth of 80 MHz.

In addition or in other embodiments of the at least one computer-readable non-transitory storage medium, determining that the first client device of the multiple client devices operates at the first bandwidth and the second client device operates at the second bandwidth can include determining that the first client device operates at a bandwidth of 40 MHz and the second client device operates at a bandwidth of 80 MHz.

In certain embodiments, the disclosure can provide an apparatus for bandwidth allocation in mixed bandwidth telecommunication environments. The apparatus can include: means for accessing information indicative of operating conditions of multiple client devices; means for determining that a first client device of the multiple client devices operates at a first bandwidth and a second client device operates at a second bandwidth, the second bandwidth is greater than the first bandwidth; means for selecting based on the information, a first resource block having contiguous orthogonal frequency division multiple access (OFDMA) tones within a channel having a spectral width equal to the second bandwidth; means for selecting based on the information, a second resource block having non-contiguous groups of OFDMA tones within the channel, the tones in the second resource block are non-allocable to the first client device; means for allocating the first resource block to the first client device; and means for allocating the second resource block to the second client device.

In addition or in other embodiments of the apparatus, the operations can further include generating a wireless transmission for the first client device using the first resource block, and sending the wireless transmission to the first client device.

In addition or in other embodiments of the apparatus, the operations can further include generating a wireless transmission for the second client device using the second resource block, and sending the wireless transmission to the second client device.

In addition or in other embodiments of the apparatus, the operations can further include sending resource allocation information indicative of the first resource block to the first client device, and receiving a wireless transmission from the first client device in the allocated first resource block.

In addition or in other embodiments of the apparatus, the operations can further include sending resource allocation information indicative of the second resource block to the second client device, and receiving a wireless transmission from the second client device in the allocated first resource block.

In addition or in other embodiments of the apparatus, determining that the first client device of the multiple client devices operates at the first bandwidth and the second client device operates at the second bandwidth can include determining that the first client device operates at a bandwidth of 20 MHz and the second client device operates at a bandwidth of 80 MHz.

In addition or in other embodiments of the apparatus, determining that the first client device of the multiple client devices operates at the first bandwidth and the second client device operates at the second bandwidth can include determining that the first client device operates at a bandwidth of 40 MHz and the second client device operates at a bandwidth of 80 MHz.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

Embodiments of the operational environments and techniques (procedures, methods, processes, and the like) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings; or the like.

As used in this disclosure, the terms "component," "environment," "system," "architecture," "interface," "unit," "engine," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," and "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a radio-frequency integrated circuit (RFIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment.

In addition, in the present specification and annexed drawings, terms such as "store," "storage," "data store," "data storage," "memory," "repository," and substantially any other information storage component relevant to the operation and functionality of a unit of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that can provide allocation of subcarriers in telecommunications including communication devices that can operate according to different operating bandwidth. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A device for communicating a high efficiency (HE) frame for a multi-user, multiple input, multiple output (MU-MIMO) communication session with one or more station devices over one or more channels, the device comprising memory and processing circuitry configured to:
   determine a resource allocation in a 80 MHz bandwidth channel, the 80 MHz bandwidth channel having 1024 tones, wherein 23 of the 1024 tones are guard tones, the resource allocation comprising:
      a first resource having a first size associated with a first number of first tones, and
      a second resource having a second size associated with a second number of second tones;
   allocate the first resource to a first station device on the 80 MHz bandwidth channel;
   allocate the second resource to a second station device on the 80 MHz bandwidth channel; and
   cause to send the HE frame, the HE frame comprising an indication of the resource allocation.

2. The device of claim 1, wherein the 23 guard tones comprise 11 first guard tones on a first side of the first tones and 12 guard tones on a second side of the first tones, and wherein one or more of the 1024 tones are direct current tones.

3. The device of claim 1, wherein the first size is different than the second size.

4. The device of claim 3, wherein the first number of first tones is 26 and the second number of second tones is 52, 106, or 242.

5. The device of claim 1, wherein the first number of first tones comprises 26 tones, 52 tones, 106 tones, or 242 tones and wherein the second number of second tones is the same as the first number of first tones.

6. The device of claim 1, further comprising a transceiver configured to transmit and receive wireless signals.

7. The device of claim 6, further comprising one or more antennas coupled to the transceiver.

8. A non-transitory computer-readable medium storing computer-executable instructions which when executed by one or more processors result in performing operations comprising:
   identifying, by a first station device, a high efficiency (HE) frame received in a 80 MHz bandwidth channel, the 80 MHz bandwidth channel having 1024 tones, wherein 23 of the 1024 tones are guard tones, the HE frame comprising:
      a first resource allocation of a first resource having a first size associated with a first number of first tones, and
      a second resource allocation of a second resource having a second size associated with a second number of second tones;
   determining that the first resource is allocated to a second station device in the 80 MHz bandwidth channel; and
   determining that the second resource is allocated to the first station device in the 80 MHz bandwidth channel.

9. The non-transitory computer-readable medium of claim 8, wherein the 23 guard tones comprise 11 first guard tones on a first side of the first tones and 12 guard tones on a second side of the first tones, and wherein one or more of the 1024 tones are direct current tones.

10. The non-transitory computer-readable medium of claim 8, wherein the first size is different than the second size.

11. The non-transitory computer-readable medium of claim 10, wherein the first number of tones is 26 and the second number of second tones is 52, 106, or 242.

12. The non-transitory computer-readable medium of claim 8, wherein the second number of second tones comprises 26 tones, 52 tones, 106 tones, or 242 tones and wherein the second number of second tones is the same as the first number of first tones.

13. A method for communicating a high efficiency (HE) frame for a multi-user, multiple input, multiple output (MU-MIMO) communication session with one or more station devices over one or more channels, the method comprising:
   determining, by one or more processors of a first device, a resource allocation in a 80 MHz bandwidth channel, the 80 MHz bandwidth channel having 1024 tones, wherein 23 of the 1024 tones are guard tones, the resource allocation comprising:
      a first resource having a first size associated with a first number of first tones, and
      a second resource having a second size associated with a second number of second tones;
   allocating the first resource to a second station device on the 80 MHz bandwidth channel;
   allocating the second resource to a third station device on the 80 MHz bandwidth channel; and
   causing to send the HE frame, the HE frame comprising an indication of the resource allocation.

14. The method of claim 13, wherein the 23 guard tones comprise 11 first guard tones on a first side of the first tones and 12 guard tones on a second side of the first tones, and wherein one or more of the 1024 tones are direct current tones.

* * * * *